(12) United States Patent
Taherzadeh Boroujeni et al.

(10) Patent No.: US 12,439,346 B2
(45) Date of Patent: Oct. 7, 2025

(54) EVENT-TRIGGERED WAVEFORM TYPE SELECTION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Jelena Damnjanovic, Del Mar, CA (US); Wooseok Nam, San Diego, CA (US); Juan Montojo, San Diego, CA (US); Junyi Li, Fairless Hills, PA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 540 days.

(21) Appl. No.: 17/865,108

(22) Filed: Jul. 14, 2022

(65) Prior Publication Data

US 2024/0023030 A1    Jan. 18, 2024

(51) Int. Cl.
| H04B 7/00 | (2006.01) |
| H04L 25/03 | (2006.01) |
| H04W 52/26 | (2009.01) |
| H04W 52/36 | (2009.01) |

(52) U.S. Cl.
CPC ..... *H04W 52/262* (2013.01); *H04L 25/03853* (2013.01); *H04W 52/365* (2013.01)

(58) Field of Classification Search
CPC ............ H04W 52/262; H04W 52/365; H04W 52/367; H04L 25/03853; H04B 7/0413; H04B 7/0417; H04B 7/0452; H04B 7/046
See application file for complete search history.

(56) References Cited

U.S. PATENT DOCUMENTS

| 10,659,207 | B2 * | 5/2020 | Wang | H04W 52/146 |
| 12,113,739 | B2 * | 10/2024 | Zhou | H04L 5/005 |
| 2010/0272091 | A1 * | 10/2010 | Fabien | H04W 52/365 |
| | | | | 370/345 |
| 2018/0035423 | A1 * | 2/2018 | Wang | H04L 5/0007 |
| 2018/0049233 | A1 * | 2/2018 | Luo | H04W 74/006 |
| 2019/0082493 | A1 * | 3/2019 | Lee | H04L 1/1874 |
| 2019/0380156 | A1 * | 12/2019 | Akkarakaran | H04W 74/0833 |
| 2021/0273759 | A1 * | 9/2021 | Maki | H04L 1/0003 |
| 2024/0260031 | A1 * | 8/2024 | Matsumura | H04L 1/08 |

* cited by examiner

*Primary Examiner* — Tuan Pham
(74) *Attorney, Agent, or Firm* — Holland & Hart LLP

(57) ABSTRACT

Methods, systems, and devices for wireless communications are described. The method may include a user equipment (UE) transmitting a first signal using a first waveform type. After transmitting the first signal using the first waveform type, the UE may identify a trigger event for waveform type switching by the UE and select a waveform type from among a set of waveform types based on identifying the trigger event. The UE may then transmit a second signal using the selected waveform type.

20 Claims, 17 Drawing Sheets

EVENT-TRIGGERED WAVEFORM TYPE SELECTION

FIELD OF TECHNOLOGY

The following relates to wireless communications, including event-triggered waveform type selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a UE may transmit a signal to a network entity using a waveform type. One waveform type may be more beneficial than another waveform type during different situations. For example, a first waveform type may be more beneficial than a second waveform type in power constrained situations.

SUMMARY

The described techniques relate to improved methods, systems, devices, and apparatuses that support event-triggered waveform type selection. For example, the described techniques provide for a user equipment (UE) to perform waveform type switching based on detecting a trigger event. In some examples, a UE may transmit, to a network entity, a first signal using a first waveform type. After transmitting the first signal using the first waveform type, the UE may identify a trigger event for waveform type switching by the UE and the UE may select a waveform type from a set of waveform types based on identifying the trigger event. Upon selecting the waveform type, the UE may transmit a second signal using the selected waveform type. Using the described techniques may allow the UE to dynamically switch between waveform types without receiving downlink signaling from the network entity triggering the waveform type switching which may reduce overhead signaling compared to other techniques.

A method for wireless communication at a UE is described. The method may include transmitting a first signal using a first waveform type, identifying, after transmitting the first signal using the first waveform type, a trigger event for waveform type switching by the UE, selecting a waveform type from among a set of multiple waveform types based on identifying the trigger event, where the set of multiple waveform types includes at least the first waveform type and a second waveform type different from the first waveform type, and transmitting a second signal using the selected waveform type.

An apparatus for wireless communication at a UE is described. The apparatus may include a processor, memory coupled with the processor, and instructions stored in the memory. The instructions may be executable by the processor to cause the apparatus to transmit a first signal using a first waveform type, identify, after transmitting the first signal using the first waveform type, a trigger event for waveform type switching by the UE, select a waveform type from among a set of multiple waveform types based on identifying the trigger event, where the set of multiple waveform types includes at least the first waveform type and a second waveform type different from the first waveform type, and transmit a second signal using the selected waveform type.

Another apparatus for wireless communication at a UE is described. The apparatus may include means for transmitting a first signal using a first waveform type, means for identifying, after transmitting the first signal using the first waveform type, a trigger event for waveform type switching by the UE, means for selecting a waveform type from among a set of multiple waveform types based on identifying the trigger event, where the set of multiple waveform types includes at least the first waveform type and a second waveform type different from the first waveform type, and means for transmitting a second signal using the selected waveform type.

A non-transitory computer-readable medium storing code for wireless communication at a UE is described. The code may include instructions executable by a processor to transmit a first signal using a first waveform type, identify, after transmitting the first signal using the first waveform type, a trigger event for waveform type switching by the UE, select a waveform type from among a set of multiple waveform types based on identifying the trigger event, where the set of multiple waveform types includes at least the first waveform type and a second waveform type different from the first waveform type, and transmit a second signal using the selected waveform type.

A method for wireless communication at a network entity is described. The method may include transmitting signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof, receiving a first signal of a first waveform type of the set of multiple waveform types, and receiving a second signal of a second waveform type of the set of multiple waveform types based on the one or more rules for waveform selection.

An apparatus for wireless communication at a network entity is described. The apparatus may include a processor, memory coupled with the processor, and instructions stored in the memory. The instructions may be executable by the processor to cause the apparatus to transmit signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof, receive a first signal of a first waveform type of the set of multiple waveform types, and receive a second signal of a second waveform type of the set of multiple waveform types based on the one or more rules for waveform selection.

Another apparatus for wireless communication at a network entity is described. The apparatus may include means for transmitting signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof, means for receiving a first signal of a first waveform type of the set of multiple waveform types, and means for receiving a second signal of a second waveform type of the set of multiple waveform types based on the one or more rules for waveform selection.

A non-transitory computer-readable medium storing code for wireless communication at a network entity is described. The code may include instructions executable by a processor to transmit signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof, receive a first signal of a first waveform type of the set of multiple waveform types, and receive a second signal of a second waveform type of the set of multiple waveform types based on the one or more rules for waveform selection.

DETAILED DESCRIPTION

Figure 1:
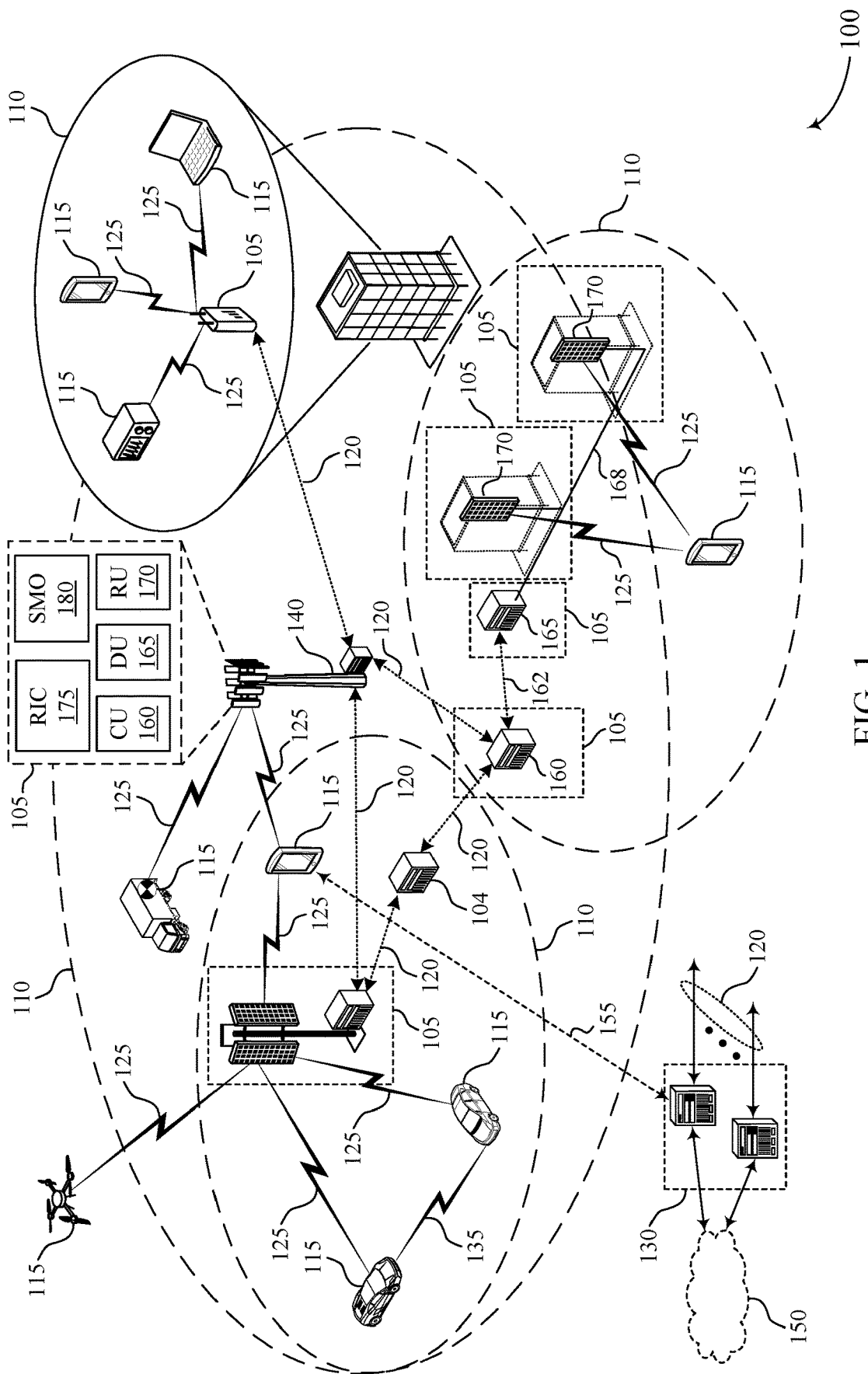
FIGS. 1 and 2 illustrate examples of a wireless communications system that supports event-triggered waveform type selection in accordance with one or more aspects of the present disclosure.

In some examples, different waveform types may exhibit performance tradeoffs and thus one waveform type may be more desirable for use than another waveform type during some situations. For example, use of a cyclic prefix orthogonal frequency domain multiplexing (CP-OFDM) waveform type may be advantageous for multiple input multiple output (MIMO) communications, whereas use of a discrete Fourier transform spread OFDM (DFT-S-OFDM) waveform type may be more power-efficient. With respect to uplink signaling, various techniques have been proposed whereby a UE may switch the waveform type used for uplink signaling based on radio resource control (RRC) or downlink control information (DCI) signaling. As one example, the UE may switch waveform type based on whether RRC signaling enables or disables transform precoding—e.g., enabling transform precoding may allow the UE to utilize the DFT-S-OFDM waveform type, and disabling transform precoding may allow the UE to utilize the CP-OFDM waveform type. As another example, the UE may receive control signaling (e.g., scheduling DCI) indicating the waveform type. Such methods to support uplink waveform type switching by a UE may, however, involve an undesirable amount of signaling overhead (e.g., an undesirable amount of downlink control signaling).

As described herein, a UE may a select a waveform type based on a trigger event. In some examples, the UE may receive control signaling from a network entity indicating a set of rules for waveform selection. The rules may indicate one or more trigger events (e.g., one or more types of events that qualify as a trigger event for waveform switching, one or more thresholds associated with the trigger events, or any combination thereof), a respective waveform type to which the UE is to switch in response to a trigger event, or any combination thereof. Examples of trigger events may include the UE transmitting a power headroom report (PHR), the UE receiving a power control command, the UE receiving a feedback message for a previously transmitted signal, etc. The waveform type may refer to one or more parameters of a waveform, such as a modulation type (e.g., CP-OFDM, DFT-S-OFDM, or OTFS modulation), a CP length, a pulse shape, etc., and in some cases switching waveform type may include switching to the use of a different modulation and coding scheme (MCS) table. Upon receiving the control signaling, the UE may monitor for the trigger event. If the UE detects the trigger event, the UE may select a waveform type in accordance with the set of rules and transmit uplink signaling to the network entity using the selected waveform type. Event-triggered waveform selection may allow the UE to automatically switch between different waveform types, which may reduce overhead of downlink control signaling as compared to other methods.

Aspects of the disclosure are initially described in the context of wireless communications systems. Additional aspects of the disclosure are described in the context of a MCS switching scheme and a process flow. Aspects of the disclosure are further illustrated by and described with reference to apparatus diagrams, system diagrams, and flowcharts that relate to event-triggered waveform type selection.

FIG. 1 illustrates an example of a wireless communications system 100 that supports event-triggered waveform type selection in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support event-triggered waveform type selection as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix (CP). A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the CP prepended to each symbol period). In some wireless communications systems 100, a slot may further be divided into multiple mini-slots associated with one or more symbols. Excluding the CP, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, MIMO communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, the UE 115 may perform waveform type switching based on detecting a trigger event. In some examples, the UE 115 may transmit, to the network entity 105, a first signal using a first waveform type. After transmitting the first signal using the first waveform type, the UE 115 may identify a trigger event for waveform type switching by the UE 115 and the UE 115 may select a waveform type from a set of waveform types based on identifying the trigger event. Upon selecting the waveform type, the UE 115 may transmit, to the network entity 105, a second signal using the selected waveform type. Using the described techniques may allow the UE 115 to dynamically switch between waveform types without receiving downlink signaling from the network entity triggering the waveform type switching which may reduce overhead signaling compared to other techniques.

Figure 2:
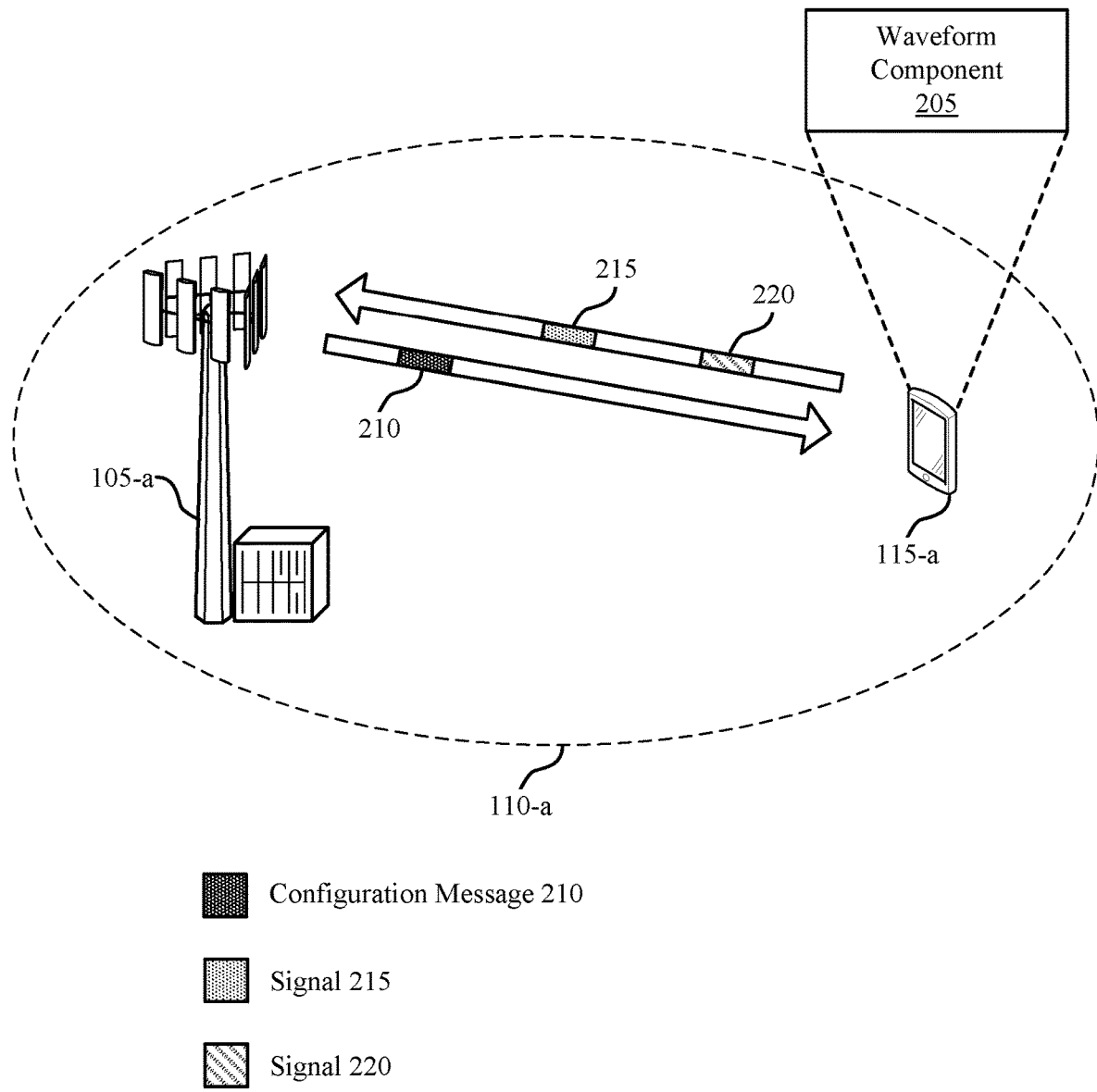

FIG. 2 illustrates an example of a wireless communications system 200 that supports event-triggered waveform type selection in accordance with one or more aspects of the present disclosure. In some examples, the wireless communications system 200 may implement aspects of a wireless communications system 100. For example, the wireless communications system 200 may include a network entity 105-a and a UE 115-a which may be examples of a network entity 105 and a UE 115 as described with reference to FIG. 1. Further, the network entity 105-a and the UE 115-a may be included in a coverage area 110-a which may be an example of a coverage area 110 as described with reference to FIG. 1.

In some examples, the UE 115-a may transmit signaling to the network entity 105-a using different waveform types. Some examples of different waveform types may be a CP orthogonal frequency division multiplexing (CP-OFDM) waveform type or a DFT-S-OFDM waveform type. The difference between the CP-OFDM waveform type and the DFT-S-OFDM waveform type may be that to generate the DFT-S-OFDM waveform type, transform precoding may be applied to the signaling. In some examples, a first waveform type may be more beneficial than a second waveform type in some scenarios. For example, the DFT-S-OFDM waveform type may allow for reduced peak to average power ratio (PAPR) and as such, may be more beneficial than the CP-OFDM waveform type in a power-limited situation. The CP-OFDM waveform type, on the other hand, may offer higher throughput when compared to the DFT-S-OFDM waveform type and as such, may be more beneficial if the UE 115-a operates according to MIMO.

In some examples, the UE 115-a may support dynamic waveform type switching. That is, the UE 115-a may switch between using the DFT-S-OFDM waveform type and the CP-OFDM waveform type. In one example, the network entity 105-a may signal to the UE 115-a which waveform type to use in DCI or other downlink signaling. However, signaling waveform type switching using DCI or other downlink signaling may unnecessarily increase overhead on the downlink.

As described herein, the UE 115-a may utilize a waveform component 205 to perform waveform type switching based on a trigger event. In such example, the UE 115-a may receive a configuration message 210 (e.g., via RRC) from the network entity 105-a. The configuration message 210 may include a set of rules for waveform type switching. For example, the set of rule may indicate to switch from using a first waveform type to using a second waveform upon detection of the trigger event. In one example, the set of rules may indicate to switch to the DFT-S-OFDM waveform type based on detecting the trigger event, where the trigger event includes a power headroom of a PHR (e.g., to be reported by the UE 115-a) being below a threshold (e.g., being a low value or negative). In another example, the set of rules may indicate to switch to the DFT-S-OFDM waveform type based on detecting the trigger event, where the trigger event includes an indication (e.g., in DCI) of an uplink shared channel transmission repetition or a number of repetitions associated with the uplink shared channel transmission exceeding a threshold. In yet another example, the set of rules may indicate to switch to the DFT-S-OFDM waveform type based on detecting the trigger event, where the trigger event includes receiving a threshold number of negative acknowledgement (NACK) messages for uplink shared channel transmissions (e.g., past uplink shared channel transmissions). Additionally or alternatively, the set of rules may indicate to switch from the DFT-S-OFDM waveform type to the CP-OFDM waveform type based on detecting the trigger event, where the trigger event includes receiving a threshold number of acknowledgement (ACK) messages for uplink shared channel transmissions.

Additional examples of trigger events may include receiving a power control command indicating to increase or decrease transmit power (e.g., in combination with a previously transmitted PHR), parameters associated with a coverage enhancement request by the UE satisfying a threshold, parameters associated with a channel state information (CSI) to be transmitted by the UE 115-a (e.g., L1 report parameters, channel quality information (CQI), etc.) satisfying a threshold, or any combination thereof. Further, in some examples, the applicability of the trigger event may depend on whether the UE 115-a utilizes multi-layer MIMO. For example, based on the trigger event, the UE 115-a may determine to switch to the DFT-S-OFDM waveform type, but may continue to use or switch to the CP-OFDM waveform type based on determining that the UE 115-a is operating according to multi-layer MIMO. Additionally or alternatively, the applicability of the trigger event may be based on the capability of the UE 115-a or the network entity 105-a.

In some examples, switching from the first waveform type to the second waveform type based on detecting the trigger event may include selecting between the CP-OFDM waveform type and the DFT-S-OFDM waveform type, changing a CP length of the signaling, changing a pulse shape of the signaling, applying a filter (e.g., for filtered OFDM) to the signaling, applying orthogonal time frequency space (OTFS) modulation to the signaling, applying spectral shaping (e.g., for the DFT-S-OFDM waveform type) to the signaling, or changing a bandwidth expansion factor of the signaling.

Upon detecting the trigger event, the UE 115-a may switch from the first waveform type to the second waveform type. That is, the UE 115-a may transmit a signal 215 using the first waveform type, select the second waveform type based on detecting the trigger event, and transmit a signal 220 using the second waveform type. In some examples, the waveform type switching may be valid for a duration. For example, the UE 115-a may switch from using the first waveform type to using the second waveform type based on detecting a trigger event and initiate a timer that has the duration. After expiration of the timer, the UE 115-a may switch back to using the first waveform type. In some examples, the network entity 105-a may configure the UE 115-a with the duration. In another example, the waveform type switching may be valid until another trigger event occurs or if downlink signaling overrides the waveform type switching. For example, the UE 115-a may switch from using the first waveform type to using the second waveform type based on detecting a first trigger event and switch from using the second waveform type to using a third waveform type based on detecting a second trigger event (e.g., an updated PHR).

In some examples, the waveform switching may apply a duration after detecting the trigger event. In such example, the UE 115-a may select a waveform type based on detecting a trigger event and refrain from transmitting a signal using the selected waveform type until the duration has passed. The duration may be an example of a processing time. The duration may be configured by the network entity 105-a and in some examples, may be based on a capability of the UE 115-a. Further, the duration may be expressed in terms of time slots, OFDM symbols, or an absolute time (e.g., milliseconds). Additionally or alternatively, the waveform switching may apply after receiving a confirmation message from the network entity 105-a. In such example, the UE 115-a may select a waveform type based on detecting the trigger event and refrain from transmitting a signal using the selected waveform type until receiving the confirmation message from the network entity 105-a.

Figure 3:
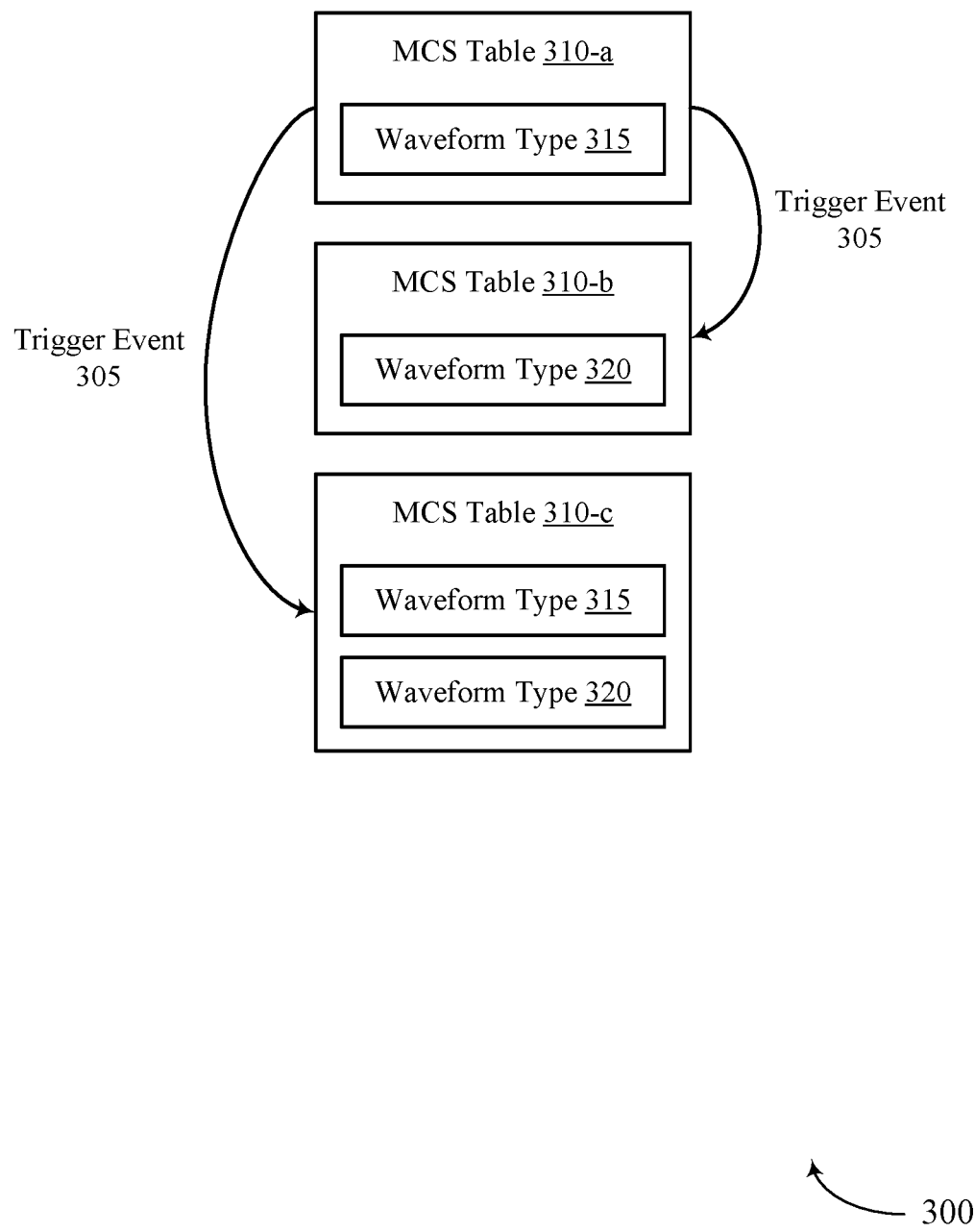
FIG. 3 illustrates an example of a modulation and coding scheme (MCS) switching scheme 300 that supports event-triggered waveform type selection in accordance with one or more aspects of the present disclosure.

FIG. 3 illustrates an example of a MCS switching scheme 300 that supports event-triggered waveform type selection in accordance with one or more aspects of the present disclosure. In some examples, the MCS switching scheme 300 may be implemented by aspects of a wireless communications system 100 and a wireless communications system 200. For example, the MCS switching scheme 300 may be implemented by a UE which may be an example of a UE 115 as described with reference to FIGS. 1 and 2.

As described with reference to FIG. 2, a network entity may transmit a configuration message to the UE. In some examples, the configuration message may include a set of rules for waveform switching. As one example, the set of rules may indicate to switch to a MCS table 310 upon detecting a trigger event 305. In some examples, the UE may be configured with a set of MCS tables 310. For example, the UE may be configured with a MCS table 310-a, a MCS table 310-b, and a MCS table 310-c. Each MCS table 310 may include multiple MCS indices, where each MCS index corresponds to a row that specifies multiple parameters (e.g., modulation type, coding rate, spatial streams, channel width, etc.).

Additionally, the MCS table 310 may be an example of single waveform MCS table or a mixed waveform MCS table. A single waveform MCS table may include rows that correspond to a single waveform type. For example, MCS table 310-a may include rows that corresponds to a waveform type 315 and MCS table 310-b may include row that correspond to a waveform type 320. A mixed waveform MCS table may include a first portion of rows that correspond to a first waveform type and a second portion of rows that correspond to a second waveform type. For example, the MCS table 310-c may include rows that corresponds to the waveform type 315 and rows that corresponds to the waveform type 320. In some examples, the waveform type 320 may be a DFT-S-OFDM waveform type and a waveform type 315 may be a CP-OFDM waveform type.

In one example, UE may initially utilize the MCS table 310-a. That is, the UE may initially utilize a single-waveform MCS table that includes rows that correspond to the CP-OFDM waveform type. While utilizing the MCS table 310-a, the UE may detect a trigger event 305. In some examples, the trigger event 305 may include the UE receiving a number of NACKs that exceeds a threshold. The set of rules may indicate upon detecting such a trigger event to select a MCS table 310-c. As such, the UE may switch from utilizing the MCS table 310-a to the MCS table 310-c. As described above, the MCS table 310-c may be a mixed waveform MCS table that includes rows corresponding to a CP-OFDM waveform type and rows corresponding to a DFT-OFDM waveform type. Alternatively, the set of rules may indicate upon detecting such a trigger event to select the MCS table 310-b. As described above, the MCS table 310-c may be a mixed-waveform MCS table that includes rows corresponding to a DFT-OFDM waveform type.

Additionally, the set of rules may indicate upon detection of such trigger event, to select the DFT-S-OFDM waveform type. Multiple NACKs may indicate that a transmit power of the signal should be increased for better reception at the network entity and in some examples, the DFT-S-OFDM waveform may allow for an increase in the transmit power of the signal. Because the UE switched from the MCS table 310-a to the MCS table 310-c or the MCS table 310-b, the UE may have the ability to select a MCS index or row that corresponds to the DFT-S-OFDM waveform. However, in some examples, the UE may not follow the set of rules. For example, the UE may operate according to multi-layer MIMO. In such example, the UE may determine to select or continue using the CP-OFDM waveform type. Because the UE switched from the MCS table 310-a to the MCS table 310-c, the UE may also have the ability to select a MCS index or row that corresponds to the CP-OFDM waveform type.

Figure 4:
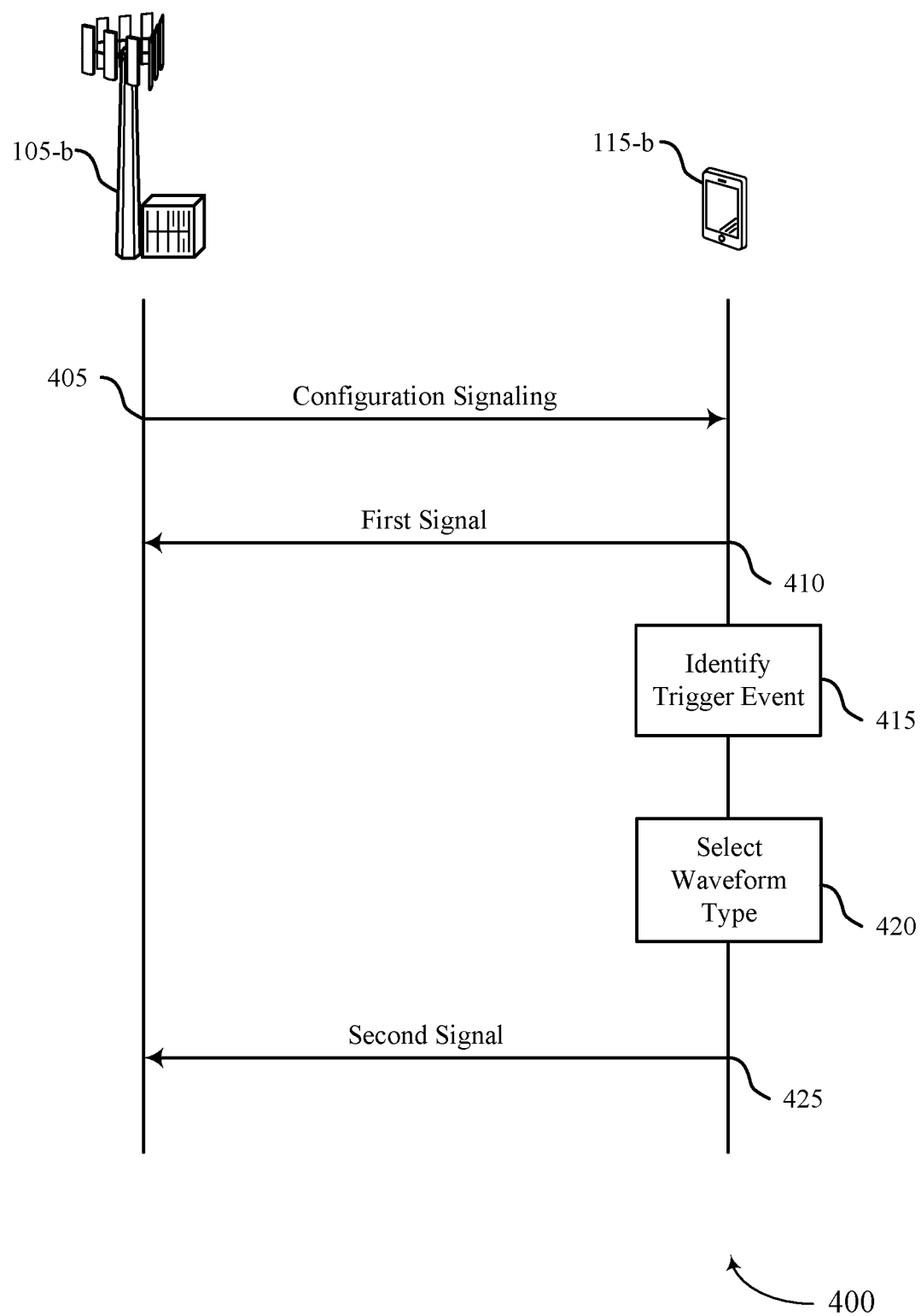
FIG. 4 illustrates an example of a process flow 400 that supports event-triggered waveform type selection in accordance with one or more aspects of the present disclosure.

FIG. 4 illustrates an example of a process flow 400 that supports event-triggered waveform type selection in accordance with one or more aspects of the present disclosure. In some examples, the process flow 400 may be implemented by aspects of a wireless communications system 100 and a wireless communications system 200. For example, the process flow 400 may be implemented by a UE 115-b and a network entity 105-b which may be examples of a UE 115 and network entity 105 as described with reference to FIGS. 1 and 2. Alternative examples of the following may be implemented, where some steps are performed in a different order than described or are not performed at all. In some cases, steps may include additional features not mentioned below, or further steps may be added.

At 405, the UE 115-b may receive, from the network entity 105-b, configuration signaling indicating one or more rules for waveform selection. In some examples, the configuration signaling may be included in RRC signaling.

At 410, the UE 115-b may transmit, to the network entity 105-b, a first signal using a first waveform type.

At 415, the UE 115-b may identify a trigger event. In some examples, the trigger event may include a metric indicated by a PHR satisfying a threshold. In another example, the trigger event may include receiving control information scheduling a set of repetitions of a PUSCH message. Additionally or alternatively, the trigger event may include receiving a power control command from the network entity 105-b. In another example, the trigger event may include transmitting a coverage enhancement request to the network entity 105-b. Additionally or alternatively, the trigger event may include receiving feedback messages (e.g., NACKs or ACKs) from the network entity or a number of received ACKs or NACK satisfying a threshold. In another example, the trigger event may include downlink channel measurements (e.g., based on received reference signals) satisfying a threshold. In some examples, the UE 115-b may identify the trigger event based on the one or more rules. That is, the one or more rules may indicate the trigger event.

At 420, the UE 115-b may select a waveform type from among a set of waveform types based on identifying the trigger event. The plurality of waveforms may include the first waveform and a second waveform different from the first waveform. In some examples, the set of waveform types may be associated with respective CP lengths, respective pulse lengths, respective filtering parameters, respective type of modulation, respective spectral shaping parameters, or respective bandwidth expansion factors. The respective types of modulation may include CP-OFDM modulation, DFT-S-OFDM modulation, or OTFS modulation. In some examples, the UE 115-b may select the waveform type based on the one or more rules. That is, the one or more rules may indicate which waveform type to select based on detecting the trigger event. In one example, the one or more rules may indicate to select a DFT-S-OFDM waveform type upon detecting that a parameter included in a PHR report is below a threshold. Additionally or alternatively, the UE 115-b may select a MCS table from among a set of MCS tables based on identifying the trigger event. In some examples, the selected waveform type may be based on the selected MCS table.

In some examples, the applicability of waveform selection may be based on whether the UE 115-b is operating in accordance with multi-layer MIMO. For example, if the UE 115-b operates in accordance with multi-layer MIMO, the UE 115-b may select the CP-OFDM waveform type regardless of the waveform type selected based on detecting the trigger event.

At 425, the UE 115-b may transmit, to the network entity 105-b, a second signal using the selected waveform type. In some examples, the UE 115-b may initiate a timer upon identifying the trigger event and refrain from switching from the first waveform type to the selected waveform type upon expiration of the timer. That is, the UE 115-b may transmit the second signal using the selected waveform type after expiration of the timer. In another example, the UE 115-b may initiate a timer upon selecting the waveform type and switch from the selected waveform type back to the first waveform type upon expiration of the timer. That is, the selected waveform type may be valid for a duration associated with the timer. In some examples, the UE 115-b may receive, after identifying the trigger event, confirmation signaling from a network entity. In such example, the UE 115-b switch from the first waveform type to the selected waveform type based on receiving the confirmation signaling. That is, the UE 115-b may transmit the second signal using the selected waveform type after receiving the confirmation signaling.

In some examples, the network entity 105-b may communicate with the UE 115-b via one or more transmission reception points (TRPs). In such example, the one or more TRPs may perform waveform type selection similar to how is described with respect to the UE 115-b. However, the one or more rules for waveform selection for the TRPs may be different from the one or more rules for waveform selection for the TRPs. Further, the network entity 105-b may communicate with the UE 115-b via multi-TRPs including at least a primary TRP and one or more additional TRPs. In such case, the additional TRPs may follow the triggering event related to the primary TRP. That is, if the primary TRP identifies a trigger event and performs waveform type switching, the additional TRPs may also perform the waveform type switching.

Figure 5:
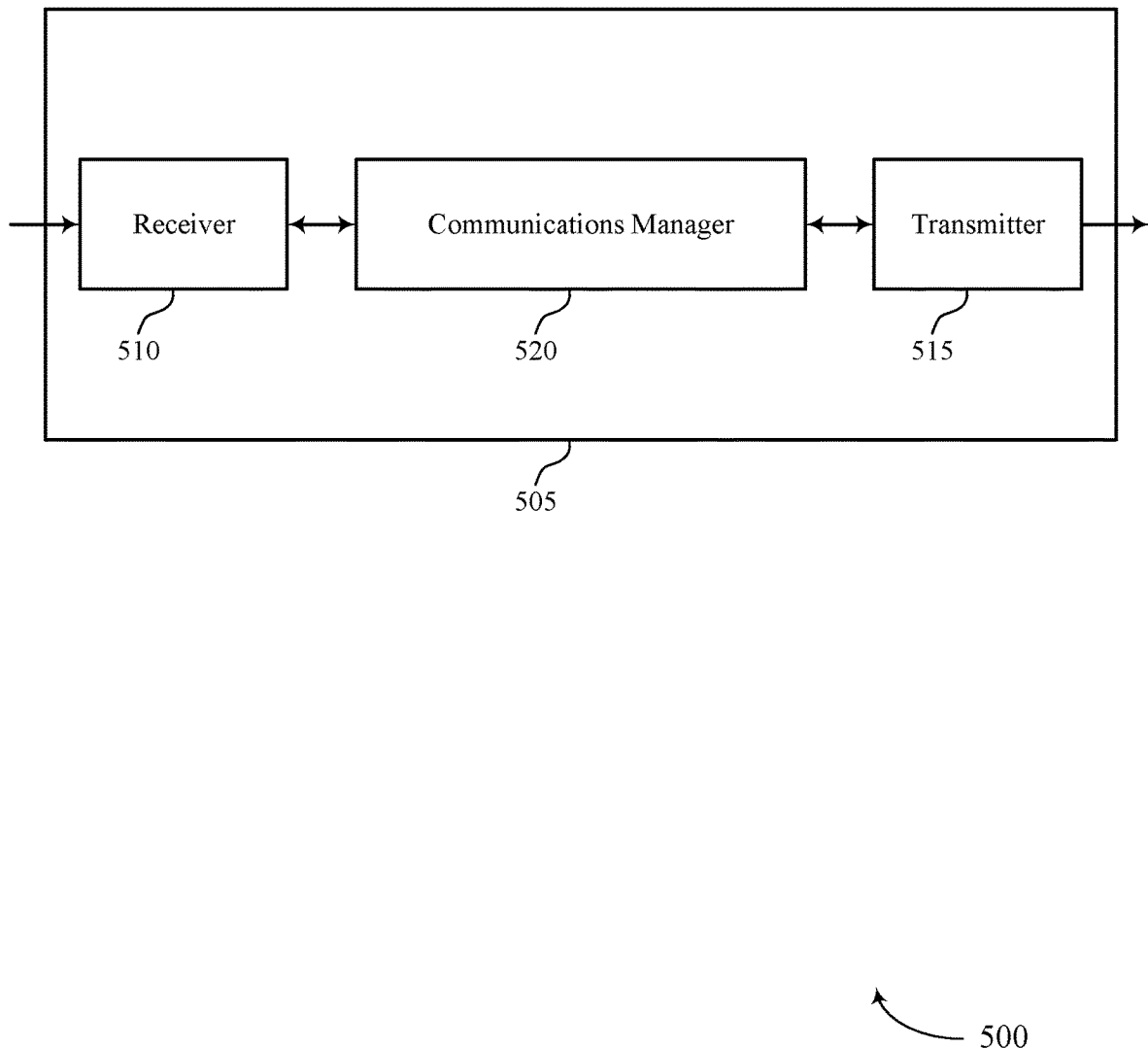
FIGS. 5 and 6 show block diagrams of devices that support event-triggered waveform type selection in accordance with one or more aspects of the present disclosure.

FIG. 5 shows a block diagram 500 of a device 505 that supports event-triggered waveform type selection in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to event-triggered waveform type selection). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to event-triggered waveform type selection). In some examples, the transmitter 515 may be co-located with a receiver 510 in a transceiver. The transmitter 515 may utilize a single antenna or a set of multiple antennas.

The communications manager 520, the receiver 510, the transmitter 515, or various combinations thereof or various components thereof may be examples of means for performing various aspects of event-triggered waveform type selection as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for transmitting a first signal using a first waveform type. The communications manager 520 may be configured as or otherwise support a means for identifying, after transmitting the first signal using the first waveform type, a trigger event for waveform type switching by the UE. The communications manager 520 may be configured as or otherwise support a means for selecting a waveform type from among a set of multiple waveform types based on identifying the trigger event, where the set of multiple waveform types includes at least the first waveform type and a second waveform type different from the first waveform type. The communications manager 520 may be configured as or otherwise support a means for transmitting a second signal using the selected waveform type.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing and more efficient utilization of communication resources.

Figure 6:
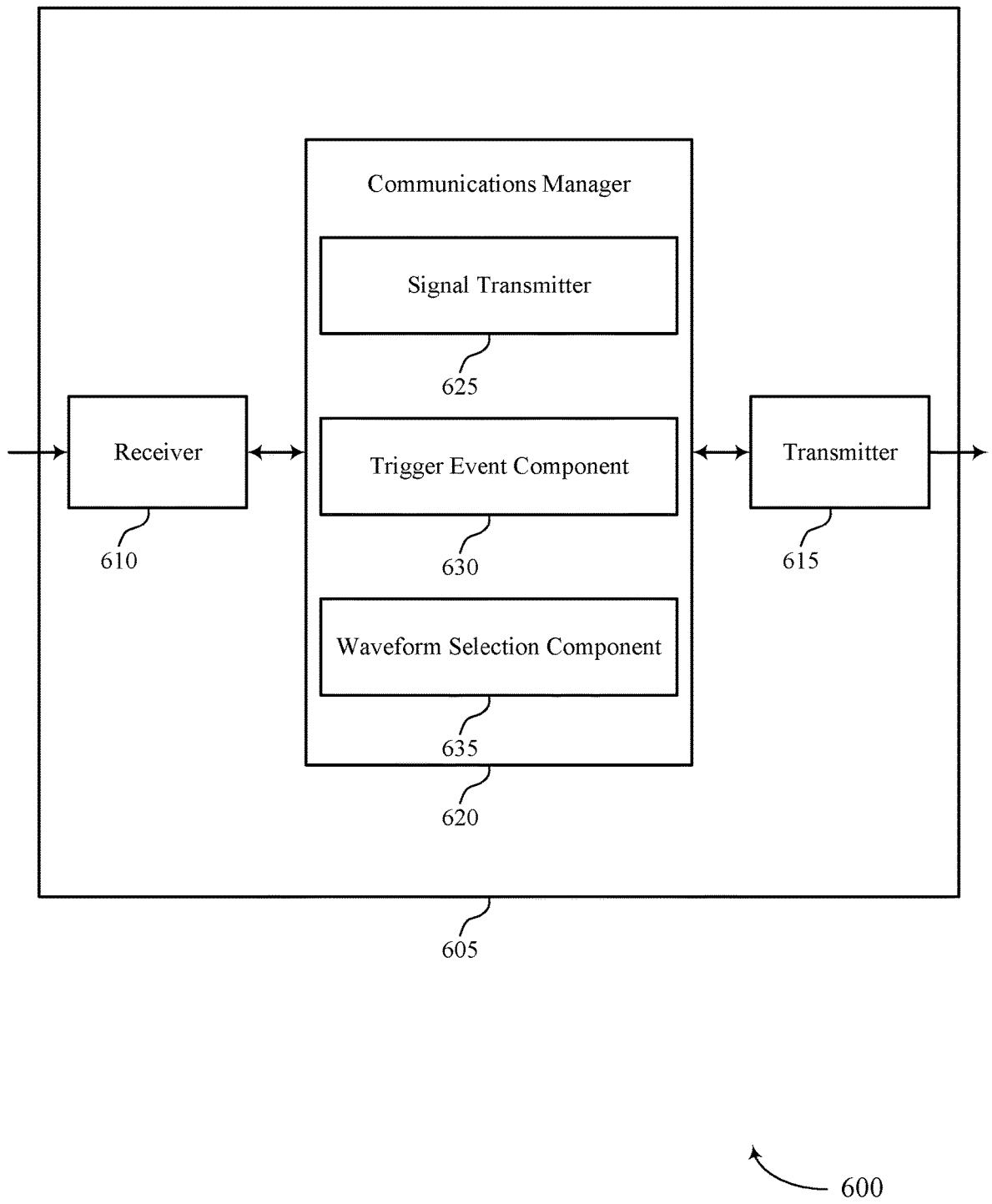

FIG. 6 shows a block diagram 600 of a device 605 that supports event-triggered waveform type selection in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to event-triggered waveform type selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to event-triggered waveform type selection). In some examples, the transmitter 615 may be co-located with a receiver 610 in a transceiver. The transmitter 615 may utilize a single antenna or a set of multiple antennas.

The device 605, or various components thereof, may be an example of means for performing various aspects of event-triggered waveform type selection as described herein. For example, the communications manager 620 may include a signal transmitter 625, a trigger event component 630, a waveform selection component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The signal transmitter 625 may be configured as or otherwise support a means for transmitting a first signal using a first waveform type. The trigger event component 630 may be configured as or otherwise support a means for identifying, after transmitting the first signal using the first waveform type, a trigger event for waveform type switching by the UE. The waveform selection component 635 may be configured as or otherwise support a means for selecting a waveform type from among a set of multiple waveform types based on identifying the trigger event, where the set of multiple waveform types includes at least the first waveform type and a second waveform type different from the first waveform type. The signal transmitter 625 may be configured as or otherwise support a means for transmitting a second signal using the selected waveform type.

Figure 7:
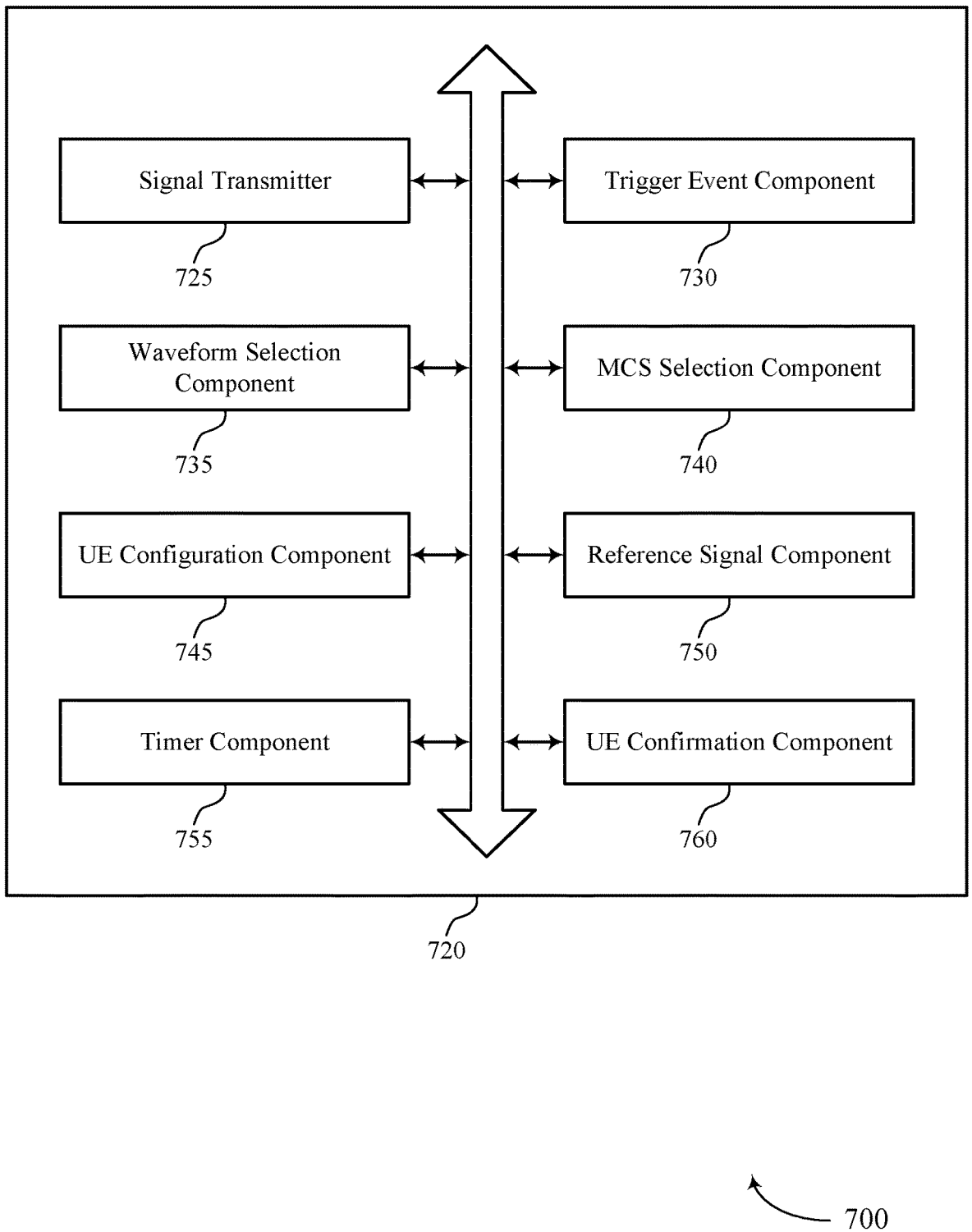
FIG. 7 shows a block diagram of a communications manager that supports event-triggered waveform type selection in accordance with one or more aspects of the present disclosure.

FIG. 7 shows a block diagram 700 of a communications manager 720 that supports event-triggered waveform type selection in accordance with one or more aspects of the present disclosure. The communications manager 720 may be an example of aspects of a communications manager 520, a communications manager 620, or both, as described herein. The communications manager 720, or various components thereof, may be an example of means for performing various aspects of event-triggered waveform type selection as described herein. For example, the communications manager 720 may include a signal transmitter 725, a trigger event component 730, a waveform selection component 735, an MCS selection component 740, a UE configuration component 745, a reference signal component 750, a timer component 755, a UE confirmation component 760, or any combination thereof. Each of these components may communicate, directly or indirectly, with one another (e.g., via one or more buses).

The communications manager 720 may support wireless communication at a UE in accordance with examples as disclosed herein. The signal transmitter 725 may be configured as or otherwise support a means for transmitting a first signal using a first waveform type. The trigger event component 730 may be configured as or otherwise support a means for identifying, after transmitting the first signal using the first waveform type, a trigger event for waveform type switching by the UE. The waveform selection component 735 may be configured as or otherwise support a means for selecting a waveform type from among a set of multiple waveform types based on identifying the trigger event, where the set of multiple waveform types includes at least the first waveform type and a second waveform type different from the first waveform type. In some examples, the signal transmitter 725 may be configured as or otherwise support a means for transmitting a second signal using the selected waveform type.

In some examples, the MCS selection component 740 may be configured as or otherwise support a means for selecting a MCS table from among a set of multiple MCS tables based on identifying the trigger event, where selected waveform type is based on the selected MCS table.

In some examples, the UE configuration component 745 may be configured as or otherwise support a means for receiving, from a network entity, signaling indicating one or more rules for waveform selection, where identifying the trigger event, selecting the waveform type, or any combination thereof is based on the one or more rules.

In some examples, the set of multiple waveform types are associated with respective CP lengths, respective pulse shapes, respective filtering parameters, respective types of modulation, respective spectral shaping parameters, respective bandwidth expansion factors, or any combination thereof.

In some examples, the respective types of modulation include two or more of CP-OFDM modulation, DFT-S-OFDM modulation, and OTFS modulation.

In some examples, the trigger event component 730 may be configured as or otherwise support a means for transmitting a PHR to a network entity, where the trigger event includes transmitting the PHR to the network entity, a metric indicated by the PHR satisfying a threshold, or any combination thereof.

In some examples, the trigger event component 730 may be configured as or otherwise support a means for receiving control information scheduling a set of repetitions of a physical uplink shared channel message, where the trigger event includes receiving the control information.

In some examples, the trigger event component 730 may be configured as or otherwise support a means for receiving a power control command from a network entity, where the trigger event includes receiving the power control command from the network entity, information indicated by the power control command, or any combination thereof.

In some examples, the trigger event component 730 may be configured as or otherwise support a means for transmitting a coverage enhancement request to a network entity, where the trigger event includes transmitting the coverage enhancement request to the network entity.

In some examples, the trigger event component 730 may be configured as or otherwise support a means for receiving a feedback message associated with the first signal from a network entity, where the trigger event includes information indicated by the feedback message.

In some examples, the reference signal component 750 may be configured as or otherwise support a means for receiving one or more reference signals from a network entity. In some examples, the trigger event component 730 may be configured as or otherwise support a means for determining that at least one measurement of the one or more reference signals satisfies a threshold, where the trigger event includes determining that the at least one measurement satisfies the threshold.

In some examples, the waveform selection component 735 may be configured as or otherwise support a means for determining whether the UE is operating in accordance with multi-layer multiple-input multiple-output (MIMO), where selecting the waveform type is based on whether the UE is operating according to multi-layer MIMO.

In some examples, the timer component 755 may be configured as or otherwise support a means for initiating a timer based on selecting the waveform type. In some examples, the signal transmitter 725 may be configured as or otherwise support a means for switching from the selected waveform type to the first waveform type based on an expiration of the timer.

In some examples, the timer component 755 may be configured as or otherwise support a means for initiating a timer based on identifying the trigger event, where transmitting the second signal using the selected waveform type is based at least in a part on an expiration of the timer.

In some examples, the UE confirmation component 760 may be configured as or otherwise support a means for receiving, after identifying the trigger event, confirmation signaling from a network entity, where selecting the waveform type is based on receiving the confirmation signaling.

Figure 8:
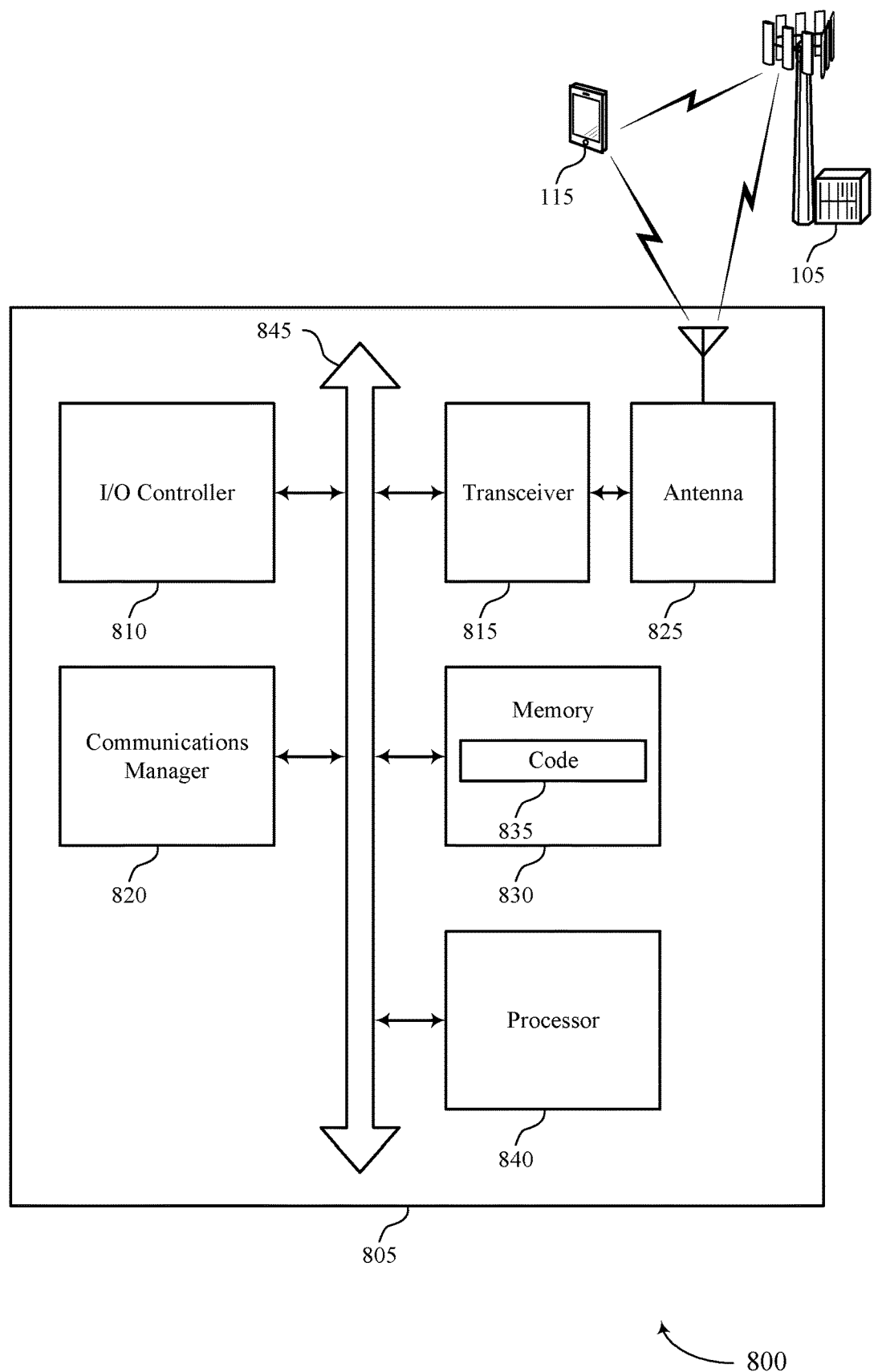
FIG. 8 shows a diagram of a system including a device that supports event-triggered waveform type selection in accordance with one or more aspects of the present disclosure.

FIG. 8 shows a diagram of a system 800 including a device 805 that supports event-triggered waveform type selection in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting event-triggered waveform type selection). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for transmitting a first signal using a first waveform type. The communications manager 820 may be configured as or otherwise support a means for identifying, after transmitting the first signal using the first waveform type, a trigger event for waveform type switching by the UE. The communications manager 820 may be configured as or otherwise support a means for selecting a waveform type from among a set of multiple waveform types based on identifying the trigger event, where the set of multiple waveform types includes at least the first waveform type and a second waveform type different from the first waveform type. The communications manager 820 may be configured as or otherwise support a means for transmitting a second signal using the selected waveform type.

By including or configuring the communications manager 820 in accordance with examples as described herein, the device 805 may support techniques for reduced power consumption, more efficient utilization of communication resources, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of event-triggered waveform type selection as described herein, or the processor 840 and the memory 830 may be otherwise configured to perform or support such operations.

Figure 9:
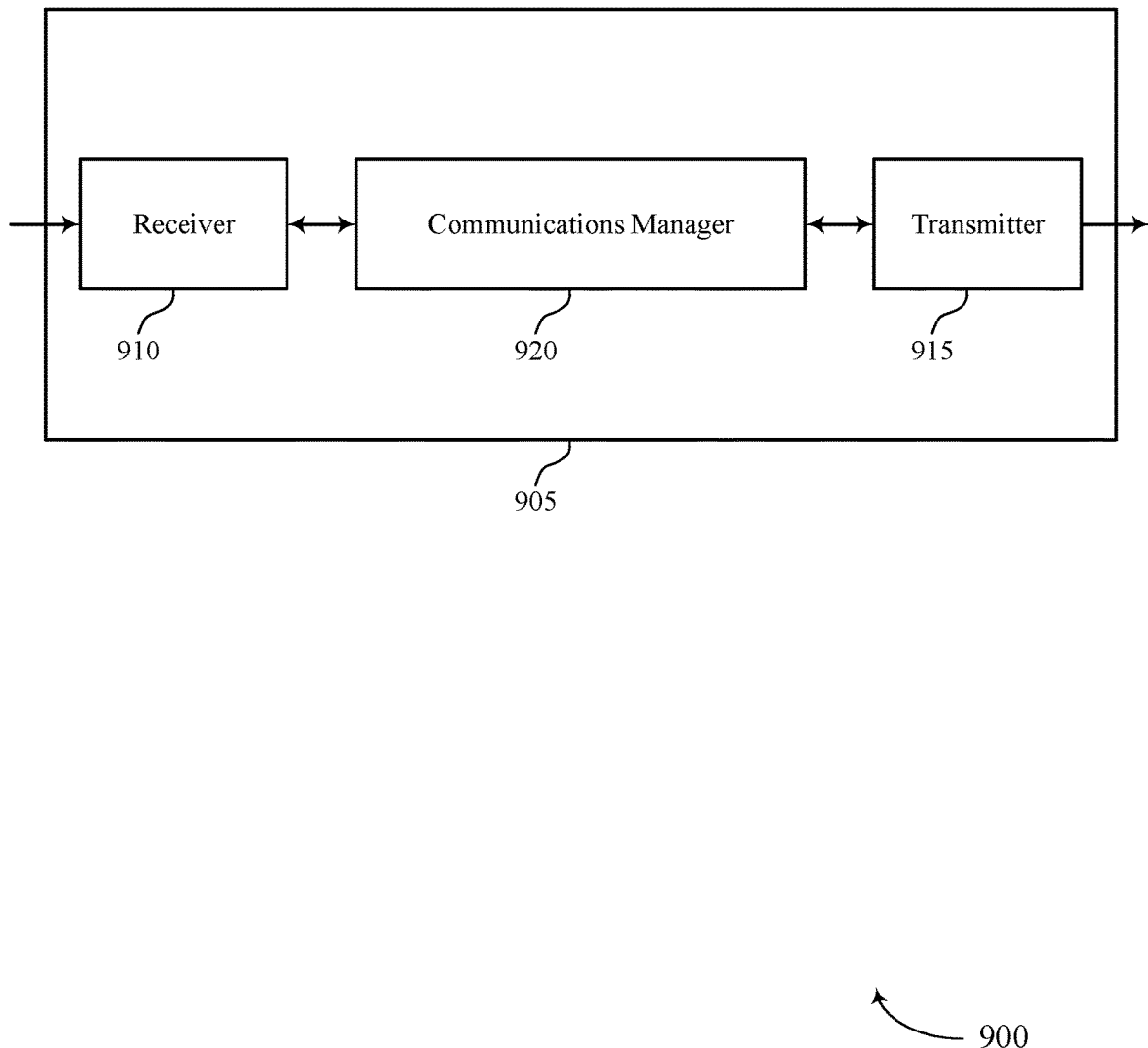
FIGS. 9 and 10 show block diagrams of devices that support event-triggered waveform type selection in accordance with one or more aspects of the present disclosure.

FIG. 9 shows a block diagram 900 of a device 905 that supports event-triggered waveform type selection in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of event-triggered waveform type selection as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof. The communications manager 920 may be configured as or otherwise support a means for receiving a first signal of a first waveform type of the set of multiple waveform types. The communications manager 920 may be configured as or otherwise support a means for receiving a second signal of a second waveform type of the set of multiple waveform types based on the one or more rules for waveform selection.

By including or configuring the communications manager 920 in accordance with examples as described herein, the device 905 (e.g., a processor controlling or otherwise coupled with the receiver 910, the transmitter 915, the communications manager 920, or a combination thereof) may support techniques reduced processing and more efficient utilization of communication resources.

Figure 10:
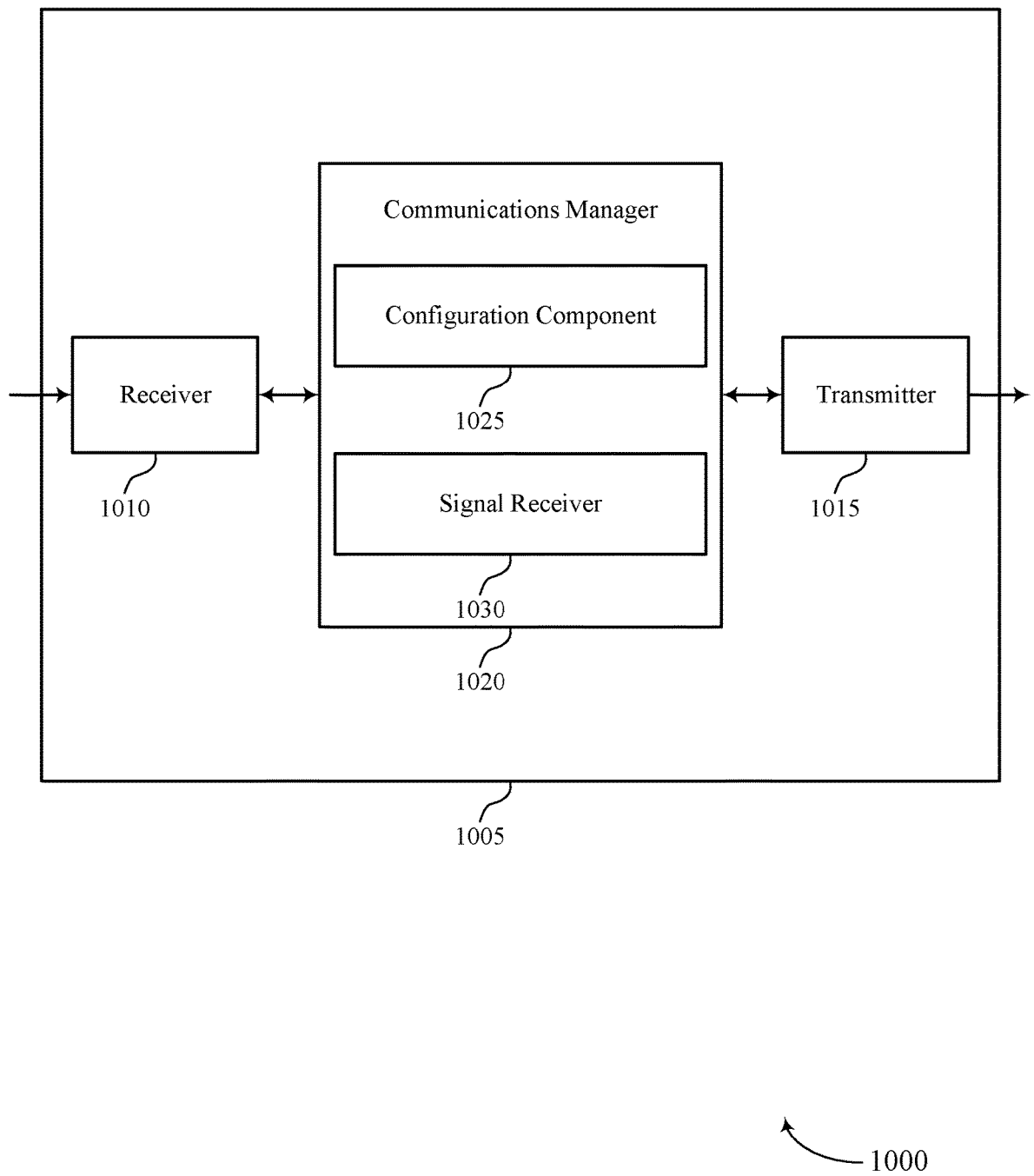

FIG. 10 shows a block diagram 1000 of a device 1005 that supports event-triggered waveform type selection in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of event-triggered waveform type selection as described herein. For example, the communications manager 1020 may include a configuration component 1025 a signal receiver 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The configuration component 1025 may be configured as or otherwise support a means for transmitting signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof. The signal receiver 1030 may be configured as or otherwise support a means for receiving a first signal of a first waveform type of the set of multiple waveform types. The signal receiver 1030 may be configured as or otherwise support a means for receiving a second signal of a second waveform type of the set of multiple waveform types based on the one or more rules for waveform selection.

Figure 11:
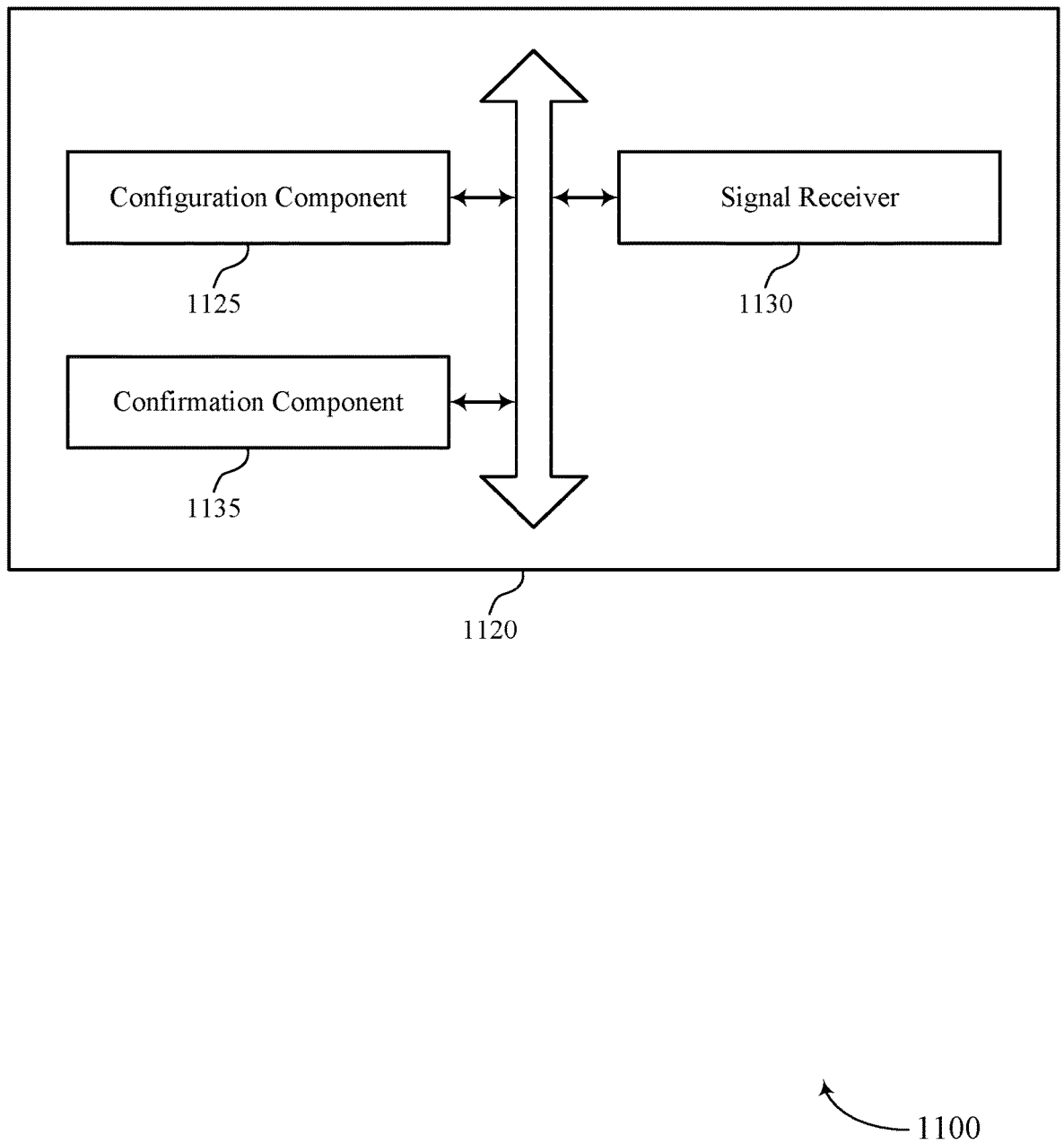
FIG. 11 shows a block diagram of a communications manager that supports event-triggered waveform type selection in accordance with one or more aspects of the present disclosure.

FIG. 11 shows a block diagram 1100 of a communications manager 1120 that supports event-triggered waveform type selection in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of event-triggered waveform type selection as described herein. For example, the communications manager 1120 may include a configuration component 1125, a signal receiver 1130, a confirmation component 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration component 1125 may be configured as or otherwise support a means for transmitting signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof. The signal receiver 1130 may be configured as or otherwise support a means for receiving a first signal of a first waveform type of the set of multiple waveform types. In some examples, the signal receiver 1130 may be configured as or otherwise support a means for receiving a second signal of a second waveform type of the set of multiple waveform types based on the one or more rules for waveform selection.

In some examples, the set of multiple waveform types are associated with respective CP lengths, respective pulse shapes, respective filtering parameters, respective types of modulation, respective spectral shaping parameters, respective bandwidth expansion factors, or any combination thereof, the respective types of modulation including two or more of CP-OFDM modulation, DFT-S-OFDM modulation, and OTFS modulation.

In some examples, the confirmation component 1135 may be configured as or otherwise support a means for transmitting, after receiving the first signal of the first waveform type, confirmation signaling to the UE, where receiving the second signal of the second waveform type is based on transmitting the confirmation signaling.

Figure 12:
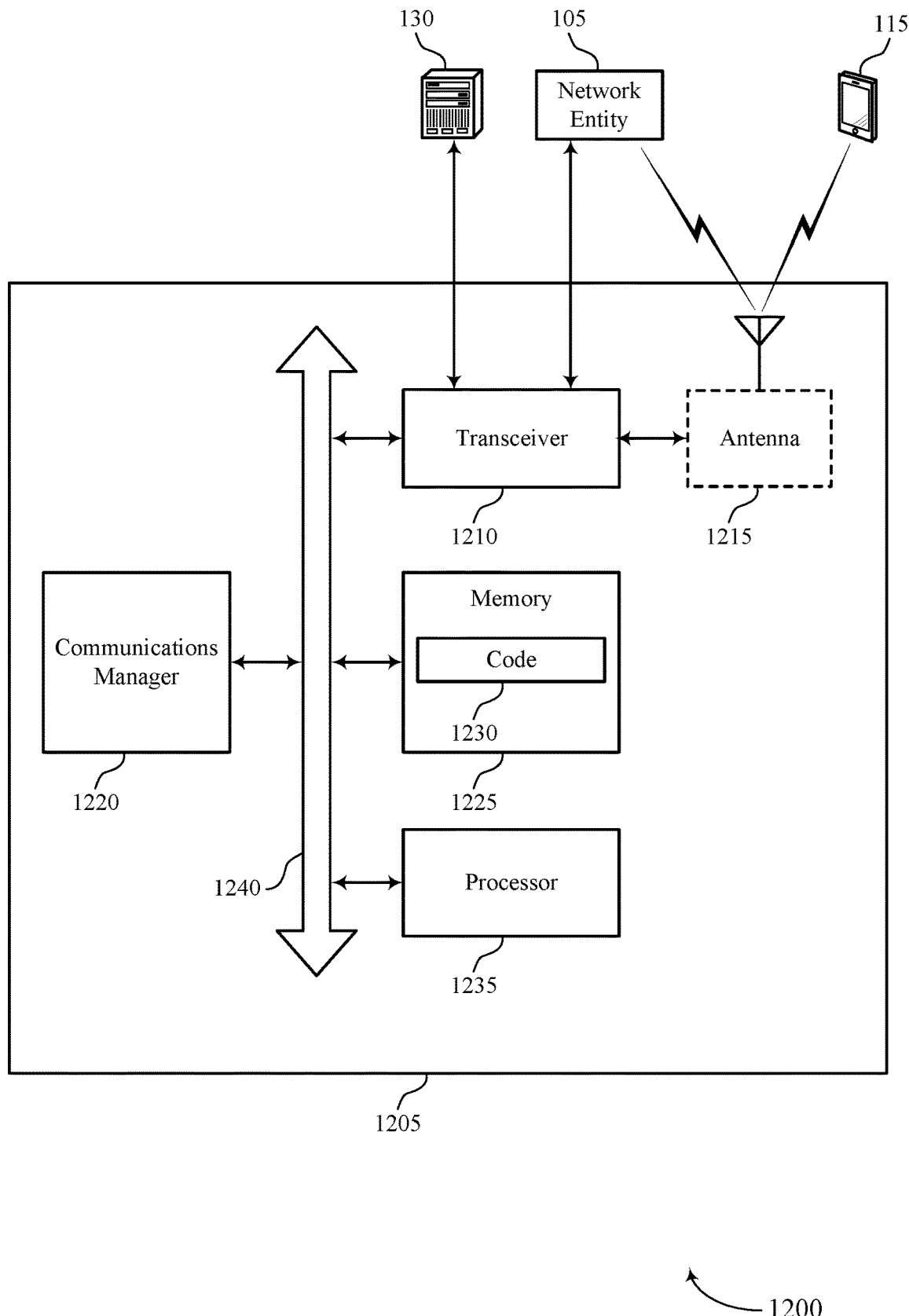
FIG. 12 shows a diagram of a system including a device that supports event-triggered waveform type selection in accordance with one or more aspects of the present disclosure.

FIG. 12 shows a diagram of a system 1200 including a device 1205 that supports event-triggered waveform type selection in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting event-triggered waveform type selection). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1205 may transmit information output from the chip or modem. In some implementations, the second interface may refer to an interface between the processing system of the chip or modem and a receiver, such that the device 1205 may obtain information or signal inputs, and the information may be passed to the processing system. A person having ordinary skill in the art will readily recognize that the first interface also may obtain information or signal inputs, and the second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof. The communications manager 1220 may be configured as or otherwise support a means for receiving a first signal of a first waveform type of the set of multiple waveform types. The communications manager 1220 may be configured as or otherwise support a means for receiving a second signal of a second waveform type of the set of multiple waveform types based on the one or more rules for waveform selection.

By including or configuring the communications manager 1220 in accordance with examples as described herein, the device 1205 may support techniques for reduced power consumption, more efficient utilization of communication resources, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of event-triggered waveform type selection as described herein, or the processor 1235 and the memory 1225 may be otherwise configured to perform or support such operations.

Figure 13:
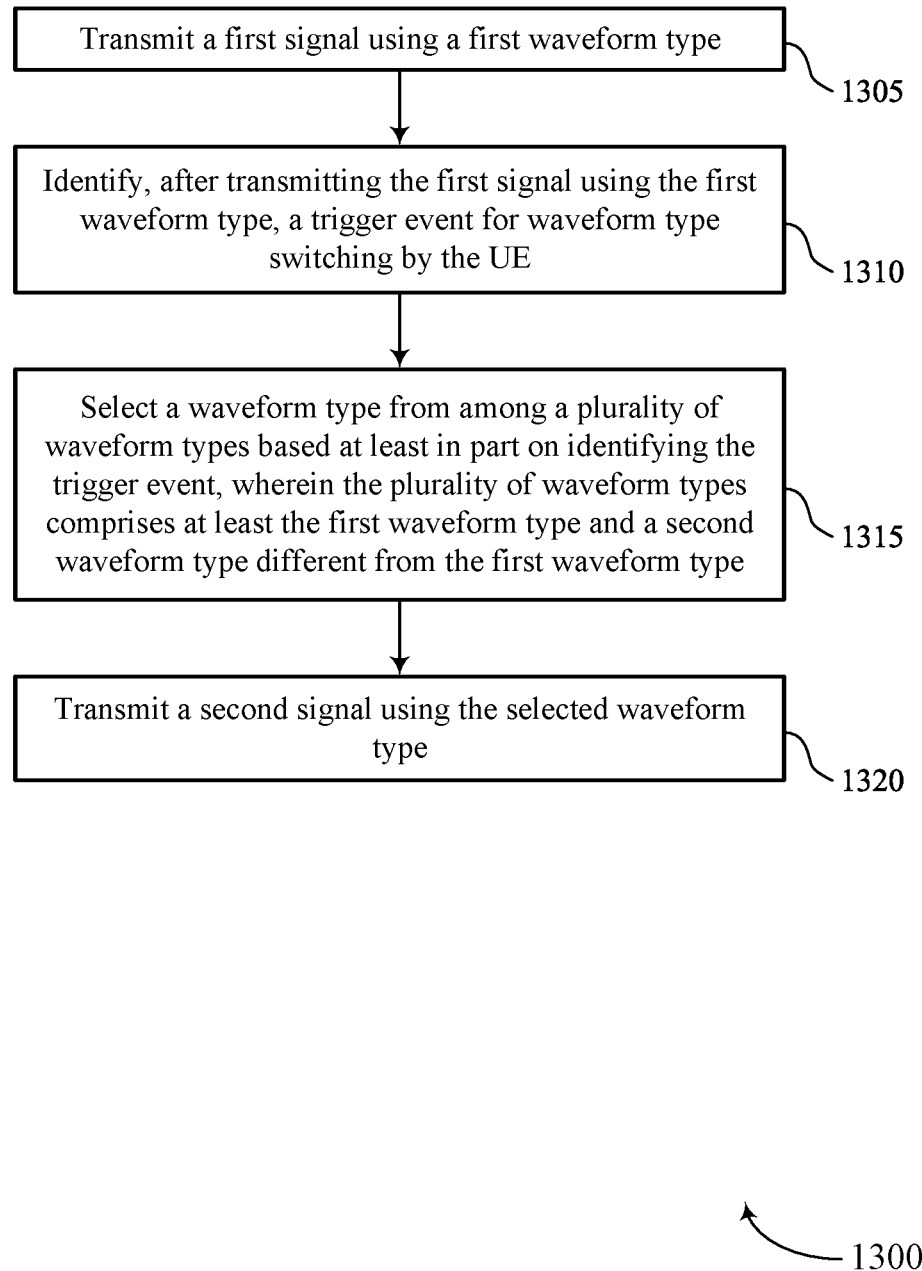
FIGS. 13 through 17 show flowcharts illustrating methods that support event-triggered waveform type selection in accordance with one or more aspects of the present disclosure.

FIG. 13 shows a flowchart illustrating a method 1300 that supports event-triggered waveform type selection in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a first signal using a first waveform type. The operations of 1305 may be performed in accordance with examples as disclosed herein. In some examples, aspects of the operations of 1305 may be performed by a signal transmitter 725 as described with reference to FIG. 7.

At 1310, the method may include identifying, after transmitting the first signal using the first waveform type, a trigger event for waveform type switching by the UE. The operations of 1310 may be performed in accordance with examples as disclosed herein. In some examples, aspects of the operations of 1310 may be performed by a trigger event component 730 as described with reference to FIG. 7.

At 1315, the method may include selecting a waveform type from among a set of multiple waveform types based on identifying the trigger event, where the set of multiple waveform types includes at least the first waveform type and a second waveform type different from the first waveform type. The operations of 1315 may be performed in accordance with examples as disclosed herein. In some examples, aspects of the operations of 1315 may be performed by a waveform selection component 735 as described with reference to FIG. 7.

At 1320, the method may include transmitting a second signal using the selected waveform type. The operations of 1320 may be performed in accordance with examples as disclosed herein. In some examples, aspects of the operations of 1320 may be performed by a signal transmitter 725 as described with reference to FIG. 7.

Figure 14:
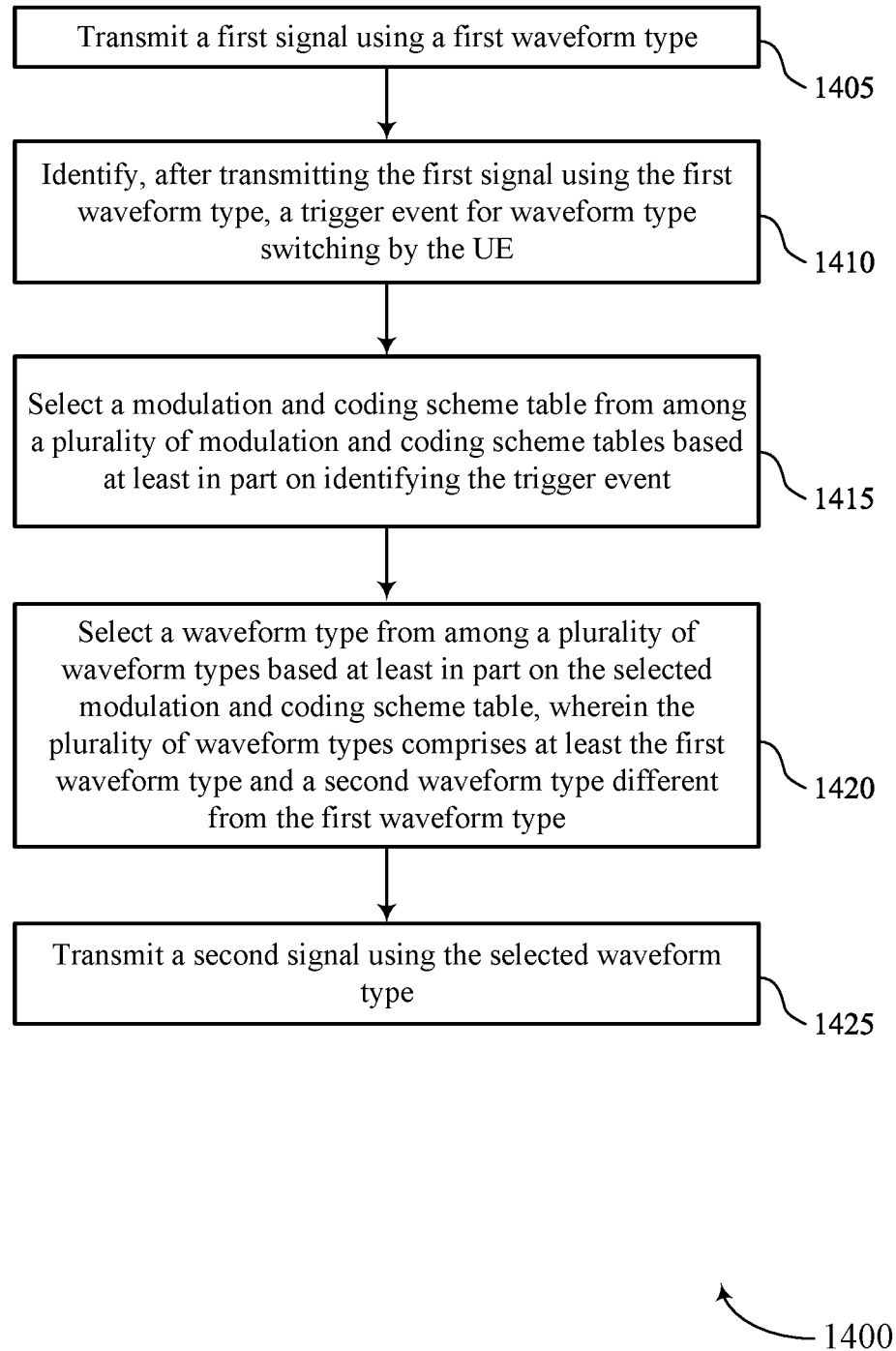

FIG. 14 shows a flowchart illustrating a method 1400 that supports event-triggered waveform type selection in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a first signal using a first waveform type. The operations of 1405 may be performed in accordance with examples as disclosed herein. In some examples, aspects of the operations of 1405 may be performed by a signal transmitter 725 as described with reference to FIG. 7.

At 1410, the method may include identifying, after transmitting the first signal using the first waveform type, a trigger event for waveform type switching by the UE. The operations of 1410 may be performed in accordance with examples as disclosed herein. In some examples, aspects of the operations of 1410 may be performed by a trigger event component 730 as described with reference to FIG. 7.

At 1415, the method may include selecting a MCS table from among a set of multiple MCS tables based on identifying the trigger event. The operations of 1415 may be performed in accordance with examples as disclosed herein. In some examples, aspects of the operations of 1415 may be performed by an MCS selection component 740 as described with reference to FIG. 7.

At 1420, the method may include selecting a waveform type from among a set of multiple waveform types based on the selected MCS table, where the set of multiple waveform types includes at least the first waveform type and a second waveform type different from the first waveform type. The operations of 1420 may be performed in accordance with examples as disclosed herein. In some examples, aspects of the operations of 1420 may be performed by a waveform selection component 735 as described with reference to FIG. 7.

At 1425, the method may include transmitting a second signal using the selected waveform type. The operations of 1425 may be performed in accordance with examples as disclosed herein. In some examples, aspects of the operations of 1425 may be performed by a signal transmitter 725 as described with reference to FIG. 7.

Figure 15:
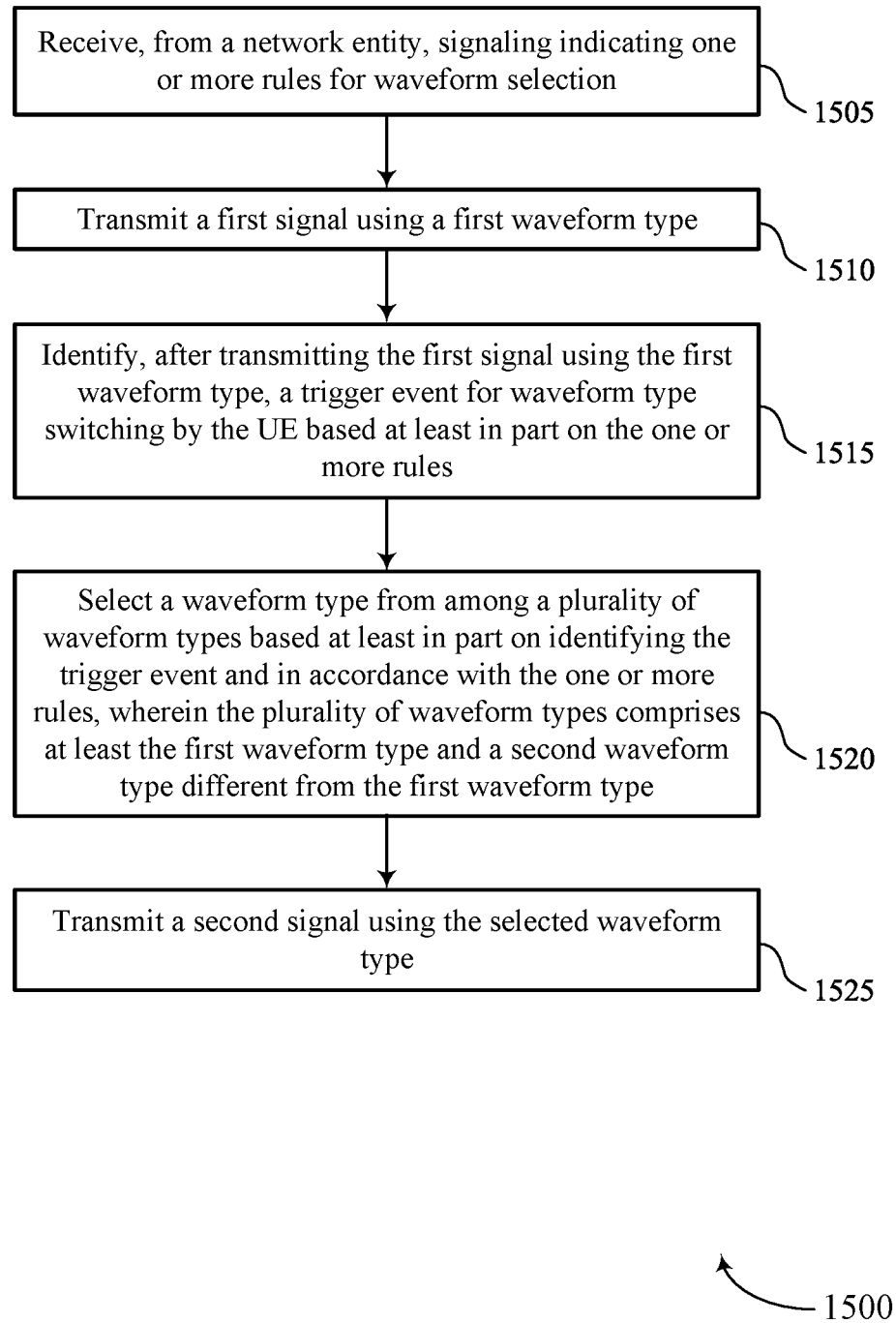

FIG. 15 shows a flowchart illustrating a method 1500 that supports event-triggered waveform type selection in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, signaling indicating one or more rules for waveform selection. The operations of 1505 may be performed in accordance with examples as disclosed herein. In some examples, aspects of the operations of 1505 may be performed by a UE configuration component 745 as described with reference to FIG. 7.

At 1510, the method may include transmitting a first signal using a first waveform type. The operations of 1510 may be performed in accordance with examples as disclosed herein. In some examples, aspects of the operations of 1510 may be performed by a signal transmitter 725 as described with reference to FIG. 7.

At 1515, the method may include identifying, after transmitting the first signal using the first waveform type, a trigger event for waveform type switching by the UE based on the one or more rules. The operations of 1515 may be performed in accordance with examples as disclosed herein. In some examples, aspects of the operations of 1515 may be performed by a trigger event component 730 as described with reference to FIG. 7.

At 1520, the method may include selecting a waveform type from among a set of multiple waveform types based on identifying the trigger event and in accordance with the one or more rules, where the set of multiple waveform types includes at least the first waveform type and a second waveform type different from the first waveform type. The operations of 1520 may be performed in accordance with examples as disclosed herein. In some examples, aspects of the operations of 1520 may be performed by a waveform selection component 735 as described with reference to FIG. 7.

At 1525, the method may include transmitting a second signal using the selected waveform type. The operations of 1525 may be performed in accordance with examples as disclosed herein. In some examples, aspects of the operations of 1525 may be performed by a signal transmitter 725 as described with reference to FIG. 7.

Figure 16:
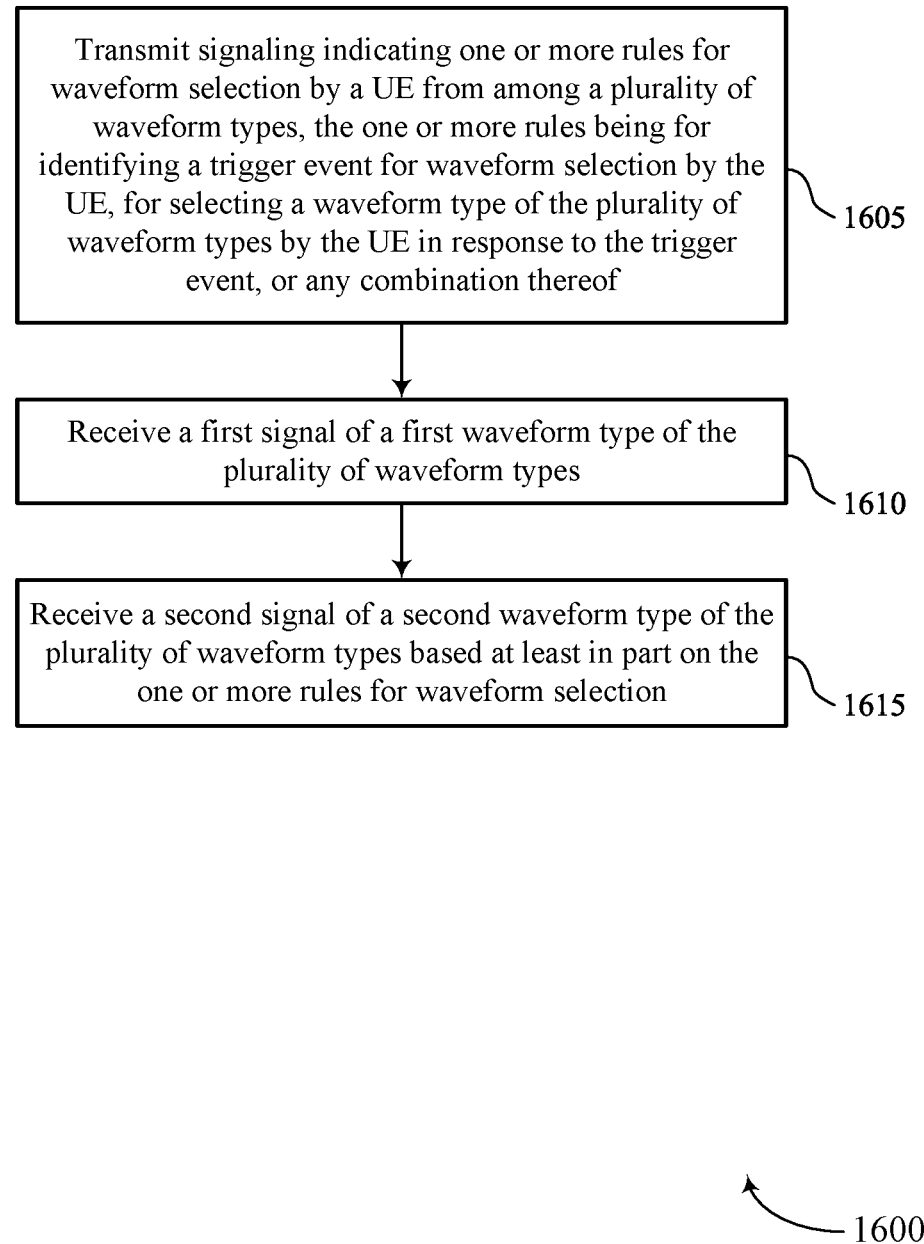

FIG. 16 shows a flowchart illustrating a method 1600 that supports event-triggered waveform type selection in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof. The operations of 1605 may be performed in accordance with examples as disclosed herein. In some examples, aspects of the operations of 1605 may be performed by a configuration component 1125 as described with reference to FIG. 11.

At 1610, the method may include receiving a first signal of a first waveform type of the set of multiple waveform types. The operations of 1610 may be performed in accordance with examples as disclosed herein. In some examples, aspects of the operations of 1610 may be performed by a signal receiver 1130 as described with reference to FIG. 11.

At 1615, the method may include receiving a second signal of a second waveform type of the set of multiple waveform types based on the one or more rules for waveform selection. The operations of 1615 may be performed in accordance with examples as disclosed herein. In some examples, aspects of the operations of 1615 may be performed by a signal receiver 1130 as described with reference to FIG. 11.

Figure 17:
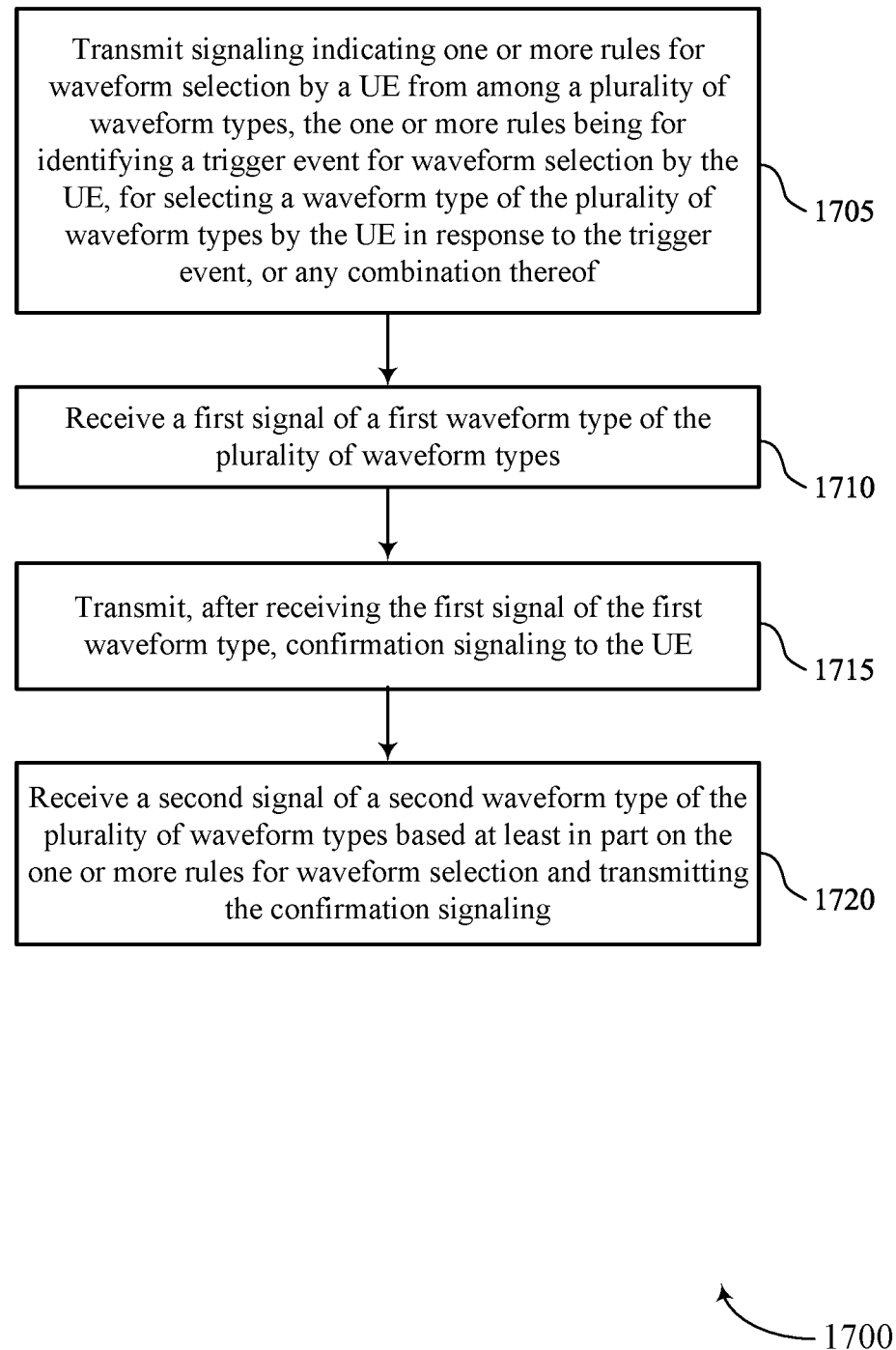

FIG. 17 shows a flowchart illustrating a method 1700 that supports event-triggered waveform type selection in accordance with one or more aspects of the present disclosure. The operations of the method 1700 may be implemented by a network entity or its components as described herein. For example, the operations of the method 1700 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1705, the method may include transmitting signaling indicating one or more rules for waveform selection by a UE from among a set of multiple waveform types, the one or more rules being for identifying a trigger event for waveform selection by the UE, for selecting a waveform type of the set of multiple waveform types by the UE in response to the trigger event, or any combination thereof. The operations of 1705 may be performed in accordance with examples as disclosed herein. In some examples, aspects of the operations of 1705 may be performed by a configuration component 1125 as described with reference to FIG. 11.

At 1710, the method may include receiving a first signal of a first waveform type of the set of multiple waveform types. The operations of 1710 may be performed in accordance with examples as disclosed herein. In some examples, aspects of the operations of 1710 may be performed by a signal receiver 1130 as described with reference to FIG. 11.

At 1715, the method may include transmitting, after receiving the first signal of the first waveform type, confirmation signaling to the UE. The operations of 1715 may be performed in accordance with examples as disclosed herein. In some examples, aspects of the operations of 1715 may be performed by a confirmation component 1135 as described with reference to FIG. 11.

At 1720, the method may include receiving a second signal of a second waveform type of the set of multiple waveform types based on the one or more rules for waveform selection and transmitting the confirmation signaling. The operations of 1720 may be performed in accordance with examples as disclosed herein. In some examples, aspects of the operations of 1720 may be performed by a signal receiver 1130 as described with reference to FIG. 11.

The following provides an overview of aspects of the present disclosure:

Aspect 1: A method for wireless communication at a UE, comprising: transmitting a first signal using a first waveform type; identifying, after transmitting the first signal using the first waveform type, a trigger event for waveform type switching by the UE; selecting a waveform type from among a plurality of waveform types based at least in part on identifying the trigger event, wherein the plurality of waveform types comprises at least the first waveform type and a second waveform type different from the first waveform type; and transmitting a second signal using the selected waveform type.

Aspect 2: The method of aspect 1, further comprising: selecting a MCS table from among a plurality of MCS tables based at least in part on identifying the trigger event, wherein selected waveform type is based at least in part on the selected MCS table.

Aspect 3: The method of any of aspects 1 through 2, further comprising: receiving, from a network entity, signaling indicating one or more rules for waveform selection, wherein identifying the trigger event, selecting the waveform type, or any combination thereof is based at least in part on the one or more rules.

Aspect 4: The method of any of aspects 1 through 3, wherein the plurality of waveform types are associated with respective CP lengths, respective pulse shapes, respective filtering parameters, respective types of modulation, respective spectral shaping parameters, respective bandwidth expansion factors, or any combination thereof.

Aspect 5: The method of aspect 4, wherein the respective types of modulation comprise two or more of CP-OFDM modulation, DFT-S-OFDM modulation, and OTFS modulation.

Aspect 6: The method of any of aspects 1 through 5, further comprising: transmitting a PHR to a network entity, wherein the trigger event comprises transmitting the PHR to the network entity, a metric indicated by the PHR satisfying a threshold, or any combination thereof.

Aspect 7: The method of any of aspects 1 through 6, further comprising: receiving control information scheduling a set of repetitions of a PUSCH message, wherein the trigger event comprises receiving the control information.

Aspect 8: The method of any of aspects 1 through 7, further comprising: receiving a power control command from a network entity, wherein the trigger event comprises receiving the power control command from the network entity, information indicated by the power control command, or any combination thereof.

Aspect 9: The method of any of aspects 1 through 8, further comprising: transmitting a coverage enhancement request to a network entity, wherein the trigger event comprises transmitting the coverage enhancement request to the network entity.

Aspect 10: The method of any of aspects 1 through 9, further comprising: receiving a feedback message associated with the first signal from a network entity, wherein the trigger event comprises information indicated by the feedback message.

Aspect 11: The method of any of aspects 1 through 10, further comprising: receiving one or more reference signals from a network entity; and determining that at least one measurement of the one or more reference signals satisfies a threshold, wherein the trigger event comprises determining that the at least one measurement satisfies the threshold.

Aspect 12: The method of any of aspects 1 through 11, further comprising: determining whether the UE is operating in accordance with multi-layer MIMO, wherein selecting the waveform type is based at least in part on whether the UE is operating according to multi-layer MIMO.

Aspect 13: The method of any of aspects 1 through 12, further comprising: initiating a timer based at least in part on selecting the waveform type; and switching from the selected waveform type to the first waveform type based at least in part on an expiration of the timer.

Aspect 14: The method of any of aspects 1 through 13, further comprising: initiating a timer based at least in part on identifying the trigger event, wherein transmitting the second signal using the selected waveform type is based at least in a part on an expiration of the timer.

Aspect 15: The method of any of aspects 1 through 14, further comprising: receiving, after identifying the trigger event, confirmation signaling from a network entity, wherein selecting the waveform type is based at least in part on receiving the confirmation signaling.

Aspect 16: A method for wireless communication at a network entity, comprising: transmitting signaling indicating one or more rules for waveform selection by a UE from among a plurality of waveform types, the one or more rules being for identifying a trigger event for waveform selection by the UE, for selecting a waveform type of the plurality of waveform types by the UE in response to the trigger event, or any combination thereof; receiving a first signal of a first waveform type of the plurality of waveform types; and receiving a second signal of a second waveform type of the plurality of waveform types based at least in part on the one or more rules for waveform selection.

Aspect 17: The method of aspect 16, wherein the plurality of waveform types are associated with respective CP lengths, respective pulse shapes, respective filtering parameters, respective types of modulation, respective spectral shaping parameters, respective bandwidth expansion factors, or any combination thereof, the respective types of modulation comprising two or more of CP-OFDM modulation, DFT-S-OFDM modulation, and OTFS modulation.

Aspect 18: The method of any of aspects 16 through 17, further comprising: transmitting, after receiving the first signal of the first waveform type, confirmation signaling to the UE, wherein receiving the second signal of the second waveform type is based at least in part on transmitting the confirmation signaling.

Aspect 19: An apparatus for wireless communication at a UE, comprising a processor; memory coupled with the processor; and instructions stored in the memory and executable by the processor to cause the apparatus to perform a method of any of aspects 1 through 15.

Aspect 20: An apparatus for wireless communication at a UE, comprising at least one means for performing a method of any of aspects 1 through 15.

Aspect 21: A non-transitory computer-readable medium storing code for wireless communication at a UE, the code comprising instructions executable by a processor to perform a method of any of aspects 1 through 15.

Aspect 22: An apparatus for wireless communication at a network entity, comprising a processor; memory coupled with the processor; and instructions stored in the memory and executable by the processor to cause the apparatus to perform a method of any of aspects 16 through 18.

Aspect 23: An apparatus for wireless communication at a network entity, comprising at least one means for performing a method of any of aspects 16 through 18.

Aspect 24: A non-transitory computer-readable medium storing code for wireless communication at a network entity, the code comprising instructions executable by a processor to perform a method of any of aspects 16 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving signaling indicating one or more rules associated with waveform selection;
    transmitting a first signal using a first waveform type;
    identifying, after transmitting the first signal using the first waveform type, a trigger event for waveform type switching by the UE;
    selecting a waveform type from among a plurality of waveform types based at least in part on identifying the trigger event, wherein at least one of identifying the trigger event or selecting the waveform type is based at least in part on the one or more rules, and wherein the plurality of waveform types comprises at least the first waveform type and a second waveform type different from the first waveform type; and
    transmitting a second signal using the selected waveform type.

2. The method of claim 1, further comprising:
    selecting a modulation and coding scheme table from among a plurality of modulation and coding scheme tables based at least in part on identifying the trigger event, wherein selected waveform type is based at least in part on the selected modulation and coding scheme table.

3. The method of claim 1, wherein the plurality of waveform types are associated with respective cyclic prefix lengths, respective pulse shapes, respective filtering parameters, respective types of modulation, respective spectral shaping parameters, respective bandwidth expansion factors, or any combination thereof.

4. The method of claim 3, wherein the respective types of modulation comprise two or more of cyclic prefix orthogonal frequency division multiplexing modulation, discrete Fourier transform spread orthogonal frequency division multiplexing modulation, and orthogonal time frequency space modulation.

5. The method of claim 1, further comprising:
    determining whether the UE is operating in accordance with multi-layer multiple-input multiple-output (MIMO), wherein selecting the waveform type is based at least in part on whether the UE is operating according to multi-layer MIMO.

6. The method of claim 1, further comprising:
    initiating a timer based at least in part on selecting the waveform type; and
    switching from the selected waveform type to the first waveform type based at least in part on an expiration of the timer.

7. The method of claim 1, further comprising:
    initiating a timer based at least in part on identifying the trigger event, wherein transmitting the second signal using the selected waveform type is based at least in a part on an expiration of the timer.

8. The method of claim 1, further comprising:
    receiving, after identifying the trigger event, confirmation signaling from a network entity, wherein selecting the waveform type is based at least in part on receiving the confirmation signaling.

9. A method for wireless communication at a network entity, comprising:

transmitting signaling indicating one or more rules associated with waveform selection by a user equipment (UE) from among a plurality of waveform types, wherein the one or more rules are for at least one of identifying a trigger event for waveform selection by the UE or selecting a waveform type from among the plurality of waveform types by the UE in response to the trigger event;

receiving a first signal of a first waveform type of the plurality of waveform types; and receiving a second signal of a second waveform type of the plurality of waveform types based at least in part on the one or more rules associated with waveform selection.

10. The method of claim 9, wherein the plurality of waveform types are associated with respective cyclic prefix lengths, respective pulse shapes, respective filtering parameters, respective types of modulation, respective spectral shaping parameters, respective bandwidth expansion factors, or any combination thereof, the respective types of modulation comprising two or more of cyclic prefix orthogonal frequency division multiplexing modulation, discrete Fourier transform spread orthogonal frequency division multiplexing modulation, and orthogonal time frequency space modulation.

11. The method of claim 9, further comprising:

transmitting, after receiving the first signal of the first waveform type, confirmation signaling to the UE, wherein receiving the second signal of the second waveform type is based at least in part on transmitting the confirmation signaling.

12. A user equipment (UE) for wireless communication, comprising:

one or more memories storing processor-executable code; and one or more processors coupled with the one or more memories and individually or collectively operable to execute the code to cause the UE to:

receive signaling indicating one or more rules associated with waveform selection;

transmit a first signal using a first waveform type;

identify, after transmitting the first signal using the first waveform type, a trigger event for waveform type switching by the UE;

select a waveform type from among a plurality of waveform types based at least in part on identifying the trigger even, wherein at least one of identifying the trigger event or selecting the waveform type is based at least in part on the one or more rules, wherein the plurality of waveform types comprises at least the first waveform type and a second waveform type different from the first waveform type; and transmit a second signal using the selected waveform type.

13. The UE of claim 12, wherein the one or more processors are individually or collectively further operable to execute the code to cause the UE to:

select a modulation and coding scheme table from among a plurality of modulation and coding scheme tables based at least in part on identifying the trigger event, wherein selected waveform type is based at least in part on the selected modulation and coding scheme table.

14. The UE of claim 12, wherein the plurality of waveform types are associated with respective cyclic prefix lengths, respective pulse shapes, respective filtering parameters, respective types of modulation, respective spectral shaping parameters, respective bandwidth expansion factors, or any combination thereof.

15. The method of claim 1, further comprising:

transmitting a power headroom report to a network entity, wherein the trigger event comprises transmission of the power headroom report to the network entity, a metric indicated by the power headroom report satisfying a threshold, or any combination thereof.

16. The method of claim 1, further comprising:

receiving control information scheduling a set of repetitions of a physical uplink shared channel message, wherein the trigger event comprises a receipt of the control information.

17. The method of claim 1, further comprising:

receiving a power control command from a network entity, wherein the trigger event comprises a receipt of the power control command from the network entity, information indicated by the power control command, or any combination thereof.

18. The method of claim 1, further comprising:

transmitting a coverage enhancement request to a network entity, wherein the trigger event comprises transmission of the coverage enhancement request to the network entity.

19. The method of claim 1, further comprising:

receiving a feedback message associated with the first signal from a network entity, wherein the trigger event comprises information indicated by the feedback message.

20. The method of claim 1, further comprising:

receiving one or more reference signals from a network entity; and determining that at least one measurement of the one or more reference signals satisfies a threshold, wherein the trigger event comprises determining that the at least one measurement satisfies the threshold.

* * * * *